United States Patent
Carlson

(10) Patent No.: US 10,110,876 B1
(45) Date of Patent: *Oct. 23, 2018

(54) SYSTEM AND METHOD FOR DISPLAYING IMAGES IN 3-D STEREO

(71) Applicant: Evans & Sutherland Computer Corporation, Salt Lake City, UT (US)

(72) Inventor: Kenneth L. Carlson, Salt Lake City, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/585,085

(22) Filed: May 2, 2017

Related U.S. Application Data

(63) Continuation of application No. 13/545,948, filed on Jul. 10, 2012, now Pat. No. 9,641,826.

(Continued)

(51) Int. Cl.
  *H04N 13/207* (2018.01)
  *H04N 13/02* (2006.01)

(52) U.S. Cl.
  CPC ....... *H04N 13/207* (2018.05); *H04N 13/0207* (2013.01)

(58) Field of Classification Search
  CPC .................................................. H04N 13/207
  See application file for complete search history.

(56) References Cited

U.S. PATENT DOCUMENTS

| 449,435 A | 3/1891 | Brotz |
|---|---|---|
| 1,525,550 A | 2/1925 | Jenkins |

(Continued)

FOREIGN PATENT DOCUMENTS

| DE | 2 325 028 | 12/1974 |
|---|---|---|
| DE | 197 21 416 | 1/1999 |

(Continued)

OTHER PUBLICATIONS

Gupta et al., "A VLSI Architecture for Updating Raster-Scan Displays," Computer Graphics, Aug. 1981, pp. 71-78, vol. 15, No. 3.

(Continued)

*Primary Examiner* — James Pontius
(74) *Attorney, Agent, or Firm* — Durham Jones & Pinegar, P.C., Intellectual Property Law Group

(57) ABSTRACT

A system and method of capturing a stereoscopic pair of images for use in forming a 3-D image of an object at a desired perceived position in a scene projected onto a dome surface. The first one of the stereoscopic pair of images is captured when the object is offset to the right of the desired perceived position in the scene. The second one of the stereoscopic pair of images is captured when the object is offset to the left of the desired perceived position in the scene. In this manner, positive parallax can be captured in front of a viewer, upward in an arc through the zenith of the dome, and beyond to the back of the dome. The system and method allows scenes projected onto a dome surface to contain positive parallax, and therefore allows objects to appear to be located beyond the dome surface when viewed in 3-D stereo, which was previously not possible.

27 Claims, 9 Drawing Sheets

Related U.S. Application Data

(60) Provisional application No. 61/546,152, filed on Oct. 12, 2011, provisional application No. 61/544,110, filed on Oct. 6, 2011.

(56) References Cited

U.S. PATENT DOCUMENTS

| | | |
|---|---|---|
| 1,548,262 A | 8/1925 | Freedman |
| 1,702,195 A | 2/1929 | Centeno |
| 1,814,701 A | 7/1931 | Ives |
| 2,415,226 A | 2/1947 | Sziklai |
| 2,688,048 A | 8/1954 | Rose |
| 2,764,628 A | 9/1956 | Bambara |
| 2,783,406 A | 2/1957 | Vanderhooft |
| 2,991,690 A | 7/1961 | Grey et al. |
| 3,201,797 A | 8/1965 | Roth |
| 3,345,462 A | 10/1967 | Good et al. |
| 3,370,505 A | 2/1968 | Bryan |
| 3,418,459 A | 12/1968 | Purdy et al. |
| 3,422,419 A | 1/1969 | Mathews et al. |
| 3,485,944 A | 12/1969 | Stephens, Jr. |
| 3,534,338 A | 10/1970 | Christensen et al. |
| 3,553,364 A | 1/1971 | Lee |
| 3,576,394 A | 4/1971 | Lee |
| 3,577,031 A | 5/1971 | Welsh et al. |
| 3,600,798 A | 8/1971 | Lee |
| 3,602,702 A | 8/1971 | Warnock |
| 3,605,083 A | 9/1971 | Kramer |
| 3,633,999 A | 1/1972 | Buckles |
| 3,656,837 A | 4/1972 | Sandbank |
| 3,659,920 A | 5/1972 | McGlasson |
| 3,668,622 A | 6/1972 | Gannett et al. |
| 3,688,298 A | 8/1972 | Miller et al. |
| 3,709,581 A | 1/1973 | McGlasson |
| 3,711,826 A | 1/1973 | La Russa |
| 3,734,602 A | 5/1973 | Deck |
| 3,734,605 A | 5/1973 | Yevick |
| 3,736,526 A | 5/1973 | Simmons |
| 3,737,573 A | 6/1973 | Kessler |
| 3,746,911 A | 7/1973 | Nathanson et al. |
| 3,757,161 A | 9/1973 | Kline |
| 3,760,222 A | 9/1973 | Smith |
| 3,764,719 A | 10/1973 | Dell |
| 3,775,760 A | 11/1973 | Strathman |
| 3,781,465 A | 12/1973 | Ernstoff et al. |
| 3,783,184 A | 1/1974 | Ernstoff et al. |
| 3,785,715 A | 1/1974 | Mecklenborg |
| 3,802,769 A | 4/1974 | Rotz et al. |
| 3,816,726 A | 6/1974 | Sutherland et al. |
| 3,818,129 A | 6/1974 | Yamamoto |
| 3,831,106 A | 8/1974 | Ward |
| 3,846,826 A | 11/1974 | Mueller |
| 3,862,360 A | 1/1975 | Dill et al. |
| 3,886,310 A | 5/1975 | Guldberg et al. |
| 3,889,107 A | 6/1975 | Sutherland |
| 3,891,889 A | 6/1975 | Fazio |
| 3,896,338 A | 7/1975 | Nathanson et al. |
| 3,899,662 A | 8/1975 | Kreeger et al. |
| 3,915,548 A | 10/1975 | Opittek et al. |
| 3,920,495 A | 11/1975 | Roberts |
| 3,922,585 A | 11/1975 | Andrews |
| 3,934,173 A | 1/1976 | Korver |
| 3,935,499 A | 1/1976 | Oess |
| 3,940,204 A | 2/1976 | Withrington |
| 3,943,281 A | 3/1976 | Keller et al. |
| 3,947,105 A | 3/1976 | Smith |
| 3,969,611 A | 7/1976 | Fonteneau |
| 3,983,452 A | 9/1976 | Bazin |
| 3,991,416 A | 11/1976 | Byles et al. |
| 4,001,663 A | 1/1977 | Bray |
| 4,009,939 A | 3/1977 | Okano |
| 4,016,658 A | 4/1977 | Porter et al. |
| 4,017,158 A | 4/1977 | Booth |
| 4,017,985 A | 4/1977 | Heartz |
| 4,021,841 A | 5/1977 | Weinger |
| 4,027,403 A | 6/1977 | Marsh et al. |
| 4,028,725 A | 6/1977 | Lewis |
| 4,048,653 A | 9/1977 | Spooner |
| 4,067,129 A | 1/1978 | Abramson et al. |
| 4,077,138 A | 3/1978 | Foerst |
| 4,093,346 A | 6/1978 | Nishino et al. |
| 4,093,347 A | 6/1978 | La Russa |
| 4,100,571 A | 7/1978 | Dykes et al. |
| 4,119,956 A | 10/1978 | Murray |
| 4,120,028 A | 10/1978 | Membrino et al. |
| 4,138,726 A | 2/1979 | Girault et al. |
| 4,139,257 A | 2/1979 | Matsumoto |
| 4,139,799 A | 2/1979 | Kureha et al. |
| 4,149,184 A | 4/1979 | Giddings et al. |
| 4,152,766 A | 5/1979 | Osofsky et al. |
| 4,163,570 A | 8/1979 | Greenaway |
| 4,170,400 A | 10/1979 | Bach et al. |
| 4,177,579 A | 12/1979 | Peters et al. |
| 4,184,700 A | 1/1980 | Greenaway |
| 4,195,911 A | 4/1980 | Bougon et al. |
| 4,197,559 A | 4/1980 | Gramling |
| 4,200,866 A | 4/1980 | Strathman |
| 4,203,051 A | 5/1980 | Hallett et al. |
| 4,211,918 A | 7/1980 | Nyfeler et al. |
| 4,222,106 A | 9/1980 | Hess et al. |
| 4,223,050 A | 9/1980 | Nyfeler et al. |
| 4,229,732 A | 10/1980 | Hartstein et al. |
| 4,234,891 A | 11/1980 | Beck et al. |
| 4,241,519 A | 12/1980 | Gilson et al. |
| 4,250,217 A | 2/1981 | Greenaway |
| 4,250,393 A | 2/1981 | Greenaway |
| 4,289,371 A | 9/1981 | Kramer |
| 4,297,723 A | 10/1981 | Whitby |
| 4,303,394 A | 12/1981 | Berke et al. |
| 4,305,057 A | 12/1981 | Rolston |
| 4,318,173 A | 3/1982 | Freedman et al. |
| 4,333,144 A | 6/1982 | Whiteside et al. |
| 4,335,402 A | 6/1982 | Holmes |
| 4,335,933 A | 6/1982 | Palmer |
| 4,338,661 A | 7/1982 | Tredennick et al. |
| 4,340,878 A | 7/1982 | Spooner et al. |
| 4,342,083 A | 7/1982 | Freedman et al. |
| 4,343,037 A | 8/1982 | Bolton |
| 4,343,532 A | 8/1982 | Palmer |
| 4,345,817 A | 8/1982 | Gwynn |
| 4,347,507 A | 8/1982 | Spooner |
| 4,348,184 A | 9/1982 | Moore |
| 4,348,185 A | 9/1982 | Breglia et al. |
| 4,348,186 A | 9/1982 | Harvey et al. |
| 4,349,815 A | 9/1982 | Spooner |
| 4,356,730 A | 11/1982 | Cade |
| 4,360,884 A | 11/1982 | Okada et al. |
| 4,375,685 A | 3/1983 | Le Goff et al. |
| 4,384,324 A | 5/1983 | Kim et al. |
| 4,390,253 A | 6/1983 | Lobb |
| 4,393,394 A | 7/1983 | McCoy |
| 4,394,727 A | 7/1983 | Hoffman et al. |
| 4,398,794 A | 8/1983 | Palmer et al. |
| 4,398,795 A | 8/1983 | Palmer |
| 4,399,861 A | 8/1983 | Carlson |
| 4,408,884 A | 10/1983 | Kleinknecht et al. |
| 4,422,019 A | 12/1983 | Meyer |
| 4,427,274 A | 1/1984 | Pund et al. |
| 4,431,260 A | 2/1984 | Palmer |
| 4,435,756 A | 3/1984 | Potash |
| 4,437,113 A | 3/1984 | Lee et al. |
| 4,439,157 A | 3/1984 | Breglia et al. |
| 4,440,839 A | 4/1984 | Mottier |
| 4,441,791 A | 4/1984 | Hornbeck |
| 4,445,197 A | 4/1984 | Lone et al. |
| 4,446,480 A | 5/1984 | Breglia et al. |
| 4,463,372 A | 7/1984 | Bennett et al. |
| 4,466,123 A | 8/1984 | Arai et al. |
| 4,471,433 A | 9/1984 | Matsumoto et al. |
| 4,472,732 A | 9/1984 | Bennett et al. |
| 4,487,584 A | 12/1984 | Allen et al. |
| 4,492,435 A | 1/1985 | Banton et al. |
| 4,498,136 A | 2/1985 | Sproul, III |
| 4,499,457 A | 2/1985 | Hintze |

(56) References Cited

U.S. PATENT DOCUMENTS

| | | |
|---|---|---|
| 4,500,163 A | 2/1985 | Burns et al. |
| 4,511,337 A | 4/1985 | Fortunato et al. |
| 4,536,058 A | 8/1985 | Shaw et al. |
| 4,539,638 A | 9/1985 | Gaffney |
| 4,546,431 A | 10/1985 | Horvath |
| 4,566,935 A | 1/1986 | Hornbeck |
| 4,570,233 A | 2/1986 | Yan et al. |
| 4,582,396 A | 4/1986 | Bos et al. |
| 4,583,185 A | 4/1986 | Heartz |
| 4,586,037 A | 4/1986 | Rosener et al. |
| 4,586,038 A | 4/1986 | Sims et al. |
| 4,589,093 A | 5/1986 | Ippolito et al. |
| 4,590,555 A | 5/1986 | Bourrez |
| 4,591,844 A | 5/1986 | Hickin et al. |
| 4,596,992 A | 6/1986 | Hornbeck |
| 4,597,633 A | 7/1986 | Fussell |
| 4,598,372 A | 7/1986 | McRoberts |
| 4,599,070 A | 7/1986 | Hladky et al. |
| 4,609,939 A | 9/1986 | Kozawa et al. |
| 4,616,217 A | 10/1986 | Nesbitt et al. |
| 4,616,262 A | 10/1986 | Toriumi et al. |
| 4,623,223 A | 11/1986 | Kempf |
| 4,623,880 A | 11/1986 | Bresenham et al. |
| 4,625,289 A | 11/1986 | Rockwood |
| 4,630,101 A | 12/1986 | Inaba |
| 4,630,884 A | 12/1986 | Jubinski |
| 4,631,690 A | 12/1986 | Corthout et al. |
| 4,633,243 A | 12/1986 | Bresenham et al. |
| 4,634,384 A | 1/1987 | Neves et al. |
| 4,636,031 A | 1/1987 | Schmadel, Jr. et al. |
| 4,636,384 A | 1/1987 | Stolle |
| 4,642,756 A | 2/1987 | Sherrod |
| 4,642,790 A | 2/1987 | Minshull et al. |
| 4,642,945 A | 2/1987 | Browning et al. |
| 4,645,459 A | 2/1987 | Graf et al. |
| 4,646,251 A | 2/1987 | Hayes et al. |
| 4,647,966 A | 3/1987 | Phillips et al. |
| 4,655,539 A | 4/1987 | Caulfield et al. |
| 4,656,506 A | 4/1987 | Ritchey |
| 4,656,578 A | 4/1987 | Chilinski et al. |
| 4,657,512 A | 4/1987 | Mecklenborg |
| 4,658,351 A | 4/1987 | Teng |
| 4,662,746 A | 5/1987 | Hornbeck |
| 4,663,617 A | 5/1987 | Stockwell |
| 4,671,650 A | 6/1987 | Hirzel et al. |
| 4,672,215 A | 6/1987 | Howard |
| 4,672,275 A | 6/1987 | Ando |
| 4,677,576 A | 6/1987 | Berlin, Jr. et al. |
| 4,679,040 A | 7/1987 | Yan |
| 4,684,215 A | 8/1987 | Shaw et al. |
| 4,692,880 A | 9/1987 | Merz et al. |
| 4,698,602 A | 10/1987 | Armitage |
| 4,704,605 A | 11/1987 | Edelson |
| 4,710,732 A | 12/1987 | Hornbeck |
| 4,714,428 A | 12/1987 | Bunker et al. |
| 4,715,005 A | 12/1987 | Heartz |
| 4,720,705 A | 1/1988 | Gupta et al. |
| 4,720,747 A | 1/1988 | Crowley |
| 4,725,110 A | 2/1988 | Glenn et al. |
| 4,727,365 A | 2/1988 | Bunker et al. |
| 4,730,261 A | 3/1988 | Smith |
| 4,731,859 A | 3/1988 | Holter et al. |
| 4,735,410 A | 4/1988 | Nobuta |
| 4,743,200 A | 5/1988 | Welch et al. |
| 4,744,615 A | 5/1988 | Fan et al. |
| 4,748,572 A | 5/1988 | Latham |
| 4,751,509 A | 6/1988 | Kubota et al. |
| 4,760,388 A | 7/1988 | Tatsumi et al. |
| 4,760,917 A | 8/1988 | Vitek |
| 4,761,253 A | 8/1988 | Antes |
| 4,763,280 A | 8/1988 | Robinson et al. |
| 4,766,555 A | 8/1988 | Bennett |
| 4,769,762 A | 9/1988 | Tsujido |
| 4,772,881 A | 9/1988 | Hannah |
| 4,777,620 A | 10/1988 | Shimoni et al. |
| 4,780,084 A | 10/1988 | Donovan |
| 4,780,711 A | 10/1988 | Doumas |
| 4,791,583 A | 12/1988 | Colburn |
| 4,794,386 A | 12/1988 | Bedrij et al. |
| 4,795,226 A | 1/1989 | Bennion et al. |
| 4,796,020 A | 1/1989 | Budrikis et al. |
| 4,799,106 A | 1/1989 | Moore et al. |
| 4,805,107 A | 2/1989 | Kieckhafer et al. |
| 4,807,158 A | 2/1989 | Blanton et al. |
| 4,807,183 A | 2/1989 | Kung et al. |
| 4,811,245 A | 3/1989 | Bunker et al. |
| 4,812,988 A | 3/1989 | Duthuit et al. |
| 4,821,212 A | 4/1989 | Heartz |
| 4,825,391 A | 4/1989 | Merz |
| 4,833,528 A | 5/1989 | Kobayashi |
| 4,837,740 A | 6/1989 | Sutherland |
| 4,854,669 A | 8/1989 | Bimbach et al. |
| 4,855,934 A | 8/1989 | Robinson |
| 4,855,937 A | 8/1989 | Heartz |
| 4,855,939 A | 8/1989 | Fitzgerald, Jr. et al. |
| 4,855,943 A | 8/1989 | Lewis |
| 4,856,869 A | 8/1989 | Sakata et al. |
| 4,868,766 A | 9/1989 | Oosterholt |
| 4,868,771 A | 9/1989 | Quick et al. |
| 4,873,515 A | 10/1989 | Dickson et al. |
| 4,884,275 A | 11/1989 | Simms |
| 4,885,703 A | 12/1989 | Deering |
| 4,893,353 A | 1/1990 | Iwaoka et al. |
| 4,893,515 A | 1/1990 | Uchida |
| 4,897,715 A | 1/1990 | Beamon, III |
| 4,899,293 A | 2/1990 | Dawson et al. |
| 4,907,237 A | 3/1990 | Dahmani et al. |
| 4,912,526 A | 3/1990 | Iwaoka et al. |
| 4,915,463 A | 4/1990 | Barbee, Jr. |
| 4,918,626 A | 4/1990 | Watkins et al. |
| 4,930,888 A | 6/1990 | Freisleben et al. |
| 4,935,879 A | 6/1990 | Ueda |
| 4,938,584 A | 7/1990 | Suematsu et al. |
| 4,940,972 A | 7/1990 | Mouchot et al. |
| 4,949,280 A | 8/1990 | Littlefield |
| 4,952,152 A | 8/1990 | Briggs et al. |
| 4,952,922 A | 8/1990 | Griffin et al. |
| 4,953,107 A | 8/1990 | Hedley et al. |
| 4,954,819 A | 9/1990 | Watkins |
| 4,955,034 A | 9/1990 | Scerbak |
| 4,959,541 A | 9/1990 | Boyd |
| 4,959,803 A | 9/1990 | Kiyohara et al. |
| 4,969,714 A | 11/1990 | Fournier, Jr. et al. |
| 4,970,500 A | 11/1990 | Hintze |
| 4,974,155 A | 11/1990 | Dulong et al. |
| 4,974,176 A | 11/1990 | Buchner et al. |
| 4,982,178 A | 1/1991 | Hintze |
| 4,984,824 A | 1/1991 | Antes et al. |
| 4,985,831 A | 1/1991 | Dulong et al. |
| 4,985,854 A | 1/1991 | Wittenburg |
| 4,991,955 A | 2/1991 | Vetter |
| 4,992,780 A | 2/1991 | Penna et al. |
| 4,994,794 A | 2/1991 | Price et al. |
| 5,005,005 A | 4/1991 | Brossia et al. |
| 5,007,705 A | 4/1991 | Morey et al. |
| 5,011,276 A | 4/1991 | Iwamoto |
| 5,016,643 A | 5/1991 | Applegate et al. |
| 5,022,732 A | 6/1991 | Engan et al. |
| 5,022,750 A | 6/1991 | Flasck |
| 5,023,725 A | 6/1991 | McCutchen |
| 5,023,818 A | 6/1991 | Wittensoldner et al. |
| 5,025,394 A | 6/1991 | Parke |
| 5,025,400 A | 6/1991 | Cook et al. |
| 5,035,473 A | 7/1991 | Kuwayama et al. |
| 5,038,352 A | 8/1991 | Lenth et al. |
| 5,043,924 A | 8/1991 | Hofmann |
| 5,047,626 A | 9/1991 | Bobb et al. |
| 5,053,698 A | 10/1991 | Ueda |
| 5,058,992 A | 10/1991 | Takahashi |
| 5,059,019 A | 10/1991 | McCullough |
| 5,061,075 A | 10/1991 | Alfano et al. |
| 5,061,919 A | 10/1991 | Watkins |
| 5,063,375 A | 11/1991 | Lien et al. |
| 5,077,608 A | 12/1991 | Dubner |

(56) References Cited

U.S. PATENT DOCUMENTS

| | | |
|---|---|---|
| 5,088,095 A | 2/1992 | Zirngibl |
| 5,089,903 A | 2/1992 | Kuwayama et al. |
| 5,095,491 A | 3/1992 | Kozlovsky et al. |
| 5,097,427 A | 3/1992 | Lathrop et al. |
| 5,101,184 A | 3/1992 | Antes |
| 5,103,306 A | 4/1992 | Weiman et al. |
| 5,103,339 A | 4/1992 | Broome |
| 5,111,468 A | 5/1992 | Kozlovsky et al. |
| 5,113,455 A | 5/1992 | Scott |
| 5,115,127 A | 5/1992 | Bobb et al. |
| 5,117,221 A | 5/1992 | Mishica, Jr. |
| RE33,973 E | 6/1992 | Kriz et al. |
| 5,121,086 A | 6/1992 | Srivastava |
| 5,123,085 A | 6/1992 | Wells et al. |
| 5,124,821 A | 6/1992 | Antier et al. |
| 5,132,812 A | 7/1992 | Takahashi et al. |
| 5,134,521 A | 7/1992 | Lacroix et al. |
| 5,136,675 A | 8/1992 | Hodson |
| 5,136,818 A | 8/1992 | Bramson |
| 5,142,788 A | 9/1992 | Willetts |
| 5,155,604 A | 10/1992 | Miekka et al. |
| 5,157,385 A | 10/1992 | Nakao et al. |
| 5,159,601 A | 10/1992 | Huber |
| 5,161,013 A | 11/1992 | Rylander et al. |
| 5,175,575 A | 12/1992 | Gersuk |
| 5,179,638 A | 1/1993 | Dawson et al. |
| 5,185,852 A | 2/1993 | Mayer |
| 5,194,969 A | 3/1993 | DiFrancesco |
| 5,196,922 A | 3/1993 | Yeomans |
| 5,198,661 A | 3/1993 | Anderson et al. |
| 5,200,818 A | 4/1993 | Neta et al. |
| 5,206,868 A | 4/1993 | Deacon |
| 5,214,757 A | 5/1993 | Mauney et al. |
| 5,222,205 A | 6/1993 | Larson et al. |
| 5,226,109 A | 7/1993 | Dawson et al. |
| 5,227,863 A | 7/1993 | Bilbrey et al. |
| 5,229,593 A | 7/1993 | Cato |
| 5,230,039 A | 7/1993 | Grossman et al. |
| 5,231,388 A | 7/1993 | Stoltz |
| 5,239,625 A | 8/1993 | Bogart et al. |
| 5,241,659 A | 8/1993 | Parulski et al. |
| 5,242,306 A | 9/1993 | Fisher |
| 5,243,448 A | 9/1993 | Banbury |
| 5,251,160 A | 10/1993 | Rockwood et al. |
| 5,252,068 A | 10/1993 | Gryder |
| 5,255,274 A | 10/1993 | Wysocki et al. |
| 5,266,930 A | 11/1993 | Ichikawa et al. |
| 5,267,045 A | 11/1993 | Stroomer |
| 5,272,473 A | 12/1993 | Thompson et al. |
| 5,276,849 A | 1/1994 | Patel |
| 5,285,397 A | 2/1994 | Heier et al. |
| 5,291,317 A | 3/1994 | Newswanger |
| 5,293,233 A | 3/1994 | Billing et al. |
| 5,297,156 A | 3/1994 | Deacon |
| 5,300,942 A | 4/1994 | Dolgoff |
| 5,301,062 A | 4/1994 | Takahashi et al. |
| 5,311,360 A | 5/1994 | Bloom et al. |
| 5,315,699 A | 5/1994 | Imai et al. |
| 5,317,576 A | 5/1994 | Leonberger et al. |
| 5,317,689 A | 5/1994 | Nack et al. |
| 5,319,744 A | 6/1994 | Kelly et al. |
| 5,320,353 A | 6/1994 | Moore |
| 5,320,534 A | 6/1994 | Thomas |
| 5,325,133 A | 6/1994 | Adachi |
| 5,325,485 A | 6/1994 | Hochmuth et al. |
| 5,326,266 A | 7/1994 | Fisher et al. |
| 5,329,323 A | 7/1994 | Biles |
| 5,333,021 A | 7/1994 | Mitsutake et al. |
| 5,333,245 A | 7/1994 | Vecchione |
| 5,341,460 A | 8/1994 | Tam |
| 5,345,280 A | 9/1994 | Kimura et al. |
| 5,347,433 A | 9/1994 | Sedlmayr |
| 5,347,620 A | 9/1994 | Zimmer |
| 5,348,477 A | 9/1994 | Welch et al. |
| 5,353,390 A | 10/1994 | Harrington |
| 5,357,579 A | 10/1994 | Buchner et al. |
| 5,359,526 A | 10/1994 | Whittington et al. |
| 5,359,704 A | 10/1994 | Rossignac et al. |
| 5,360,010 A | 11/1994 | Applegate |
| 5,361,386 A | 11/1994 | Watkins et al. |
| 5,363,220 A | 11/1994 | Kuwayama et al. |
| 5,363,475 A | 11/1994 | Baker et al. |
| 5,363,476 A | 11/1994 | Kurashige et al. |
| 5,367,585 A | 11/1994 | Ghezzo et al. |
| 5,367,615 A | 11/1994 | Economy et al. |
| 5,369,450 A | 11/1994 | Haseltine et al. |
| 5,369,735 A | 11/1994 | Thier et al. |
| 5,369,739 A | 11/1994 | Akeley |
| 5,377,320 A | 12/1994 | Abi-Ezzi et al. |
| 5,379,371 A | 1/1995 | Usami et al. |
| 5,380,995 A | 1/1995 | Udd et al. |
| 5,381,338 A | 1/1995 | Wysocki et al. |
| 5,381,519 A | 1/1995 | Brown et al. |
| 5,384,719 A | 1/1995 | Baker et al. |
| 5,388,206 A | 2/1995 | Poulton et al. |
| 5,394,414 A | 2/1995 | Kozlovsky et al. |
| 5,394,515 A | 2/1995 | Lentz et al. |
| 5,394,516 A | 2/1995 | Winser |
| 5,396,349 A | 3/1995 | Roberts et al. |
| 5,398,083 A | 3/1995 | Tsujihara et al. |
| 5,408,249 A | 4/1995 | Wharton et al. |
| 5,408,606 A | 4/1995 | Eckart |
| 5,410,371 A | 4/1995 | Lambert |
| 5,412,796 A | 5/1995 | Olive |
| 5,422,986 A | 6/1995 | Neely |
| 5,430,888 A | 7/1995 | Witek et al. |
| 5,432,863 A | 7/1995 | Benati et al. |
| 5,444,839 A | 8/1995 | Silverbrook et al. |
| 5,451,765 A | 9/1995 | Gerber |
| 5,459,610 A | 10/1995 | Bloom et al. |
| 5,459,835 A | 10/1995 | Trevett |
| 5,465,121 A | 11/1995 | Blalock et al. |
| 5,465,368 A | 11/1995 | Davidson et al. |
| 5,471,545 A | 11/1995 | Negami et al. |
| 5,471,567 A | 11/1995 | Soderberg et al. |
| 5,473,373 A | 12/1995 | Hwung et al. |
| 5,473,391 A | 12/1995 | Usui |
| 5,479,597 A | 12/1995 | Fellous |
| 5,480,305 A | 1/1996 | Montag et al. |
| 5,487,665 A | 1/1996 | Lechner et al. |
| 5,488,687 A | 1/1996 | Rich |
| 5,489,920 A | 2/1996 | Kaasila |
| 5,490,238 A | 2/1996 | Watkins |
| 5,490,240 A | 2/1996 | Foran et al. |
| 5,493,439 A | 2/1996 | Engle |
| 5,493,629 A | 2/1996 | Stange |
| 5,495,563 A | 2/1996 | Winser |
| 5,499,194 A | 3/1996 | Prestidge et al. |
| 5,500,747 A | 3/1996 | Tanide et al. |
| 5,500,761 A | 3/1996 | Goossen et al. |
| 5,502,482 A | 3/1996 | Graham |
| 5,502,782 A | 3/1996 | Smith |
| 5,504,496 A | 4/1996 | Tanaka et al. |
| 5,506,949 A | 4/1996 | Perrin |
| 5,519,518 A | 5/1996 | Watanabe et al. |
| 5,535,374 A | 7/1996 | Olive |
| 5,536,085 A | 7/1996 | Li et al. |
| 5,537,159 A | 7/1996 | Suematsu et al. |
| 5,539,577 A | 7/1996 | Si et al. |
| 5,541,769 A | 7/1996 | Ansley et al. |
| 5,544,306 A | 8/1996 | Deering et al. |
| 5,544,340 A | 8/1996 | Doi et al. |
| 5,550,960 A | 8/1996 | Shirman et al. |
| 5,551,283 A | 9/1996 | Manaka et al. |
| 5,557,297 A | 9/1996 | Sharp et al. |
| 5,557,733 A | 9/1996 | Hicok et al. |
| 5,559,952 A | 9/1996 | Fujimoto |
| 5,559,954 A | 9/1996 | Sakoda et al. |
| 5,561,745 A | 10/1996 | Jackson et al. |
| 5,566,370 A | 10/1996 | Young |
| 5,572,229 A | 11/1996 | Fisher |
| 5,574,847 A | 11/1996 | Eckart et al. |
| 5,579,456 A | 11/1996 | Cosman |
| 5,584,696 A | 12/1996 | Walker et al. |

(56) References Cited

U.S. PATENT DOCUMENTS

| | | |
|---|---|---|
| 5,586,291 A | 12/1996 | Lasker et al. |
| 5,590,254 A | 12/1996 | Lippincott et al. |
| 5,594,854 A | 1/1997 | Baldwin et al. |
| 5,598,517 A | 1/1997 | Watkins |
| 5,604,849 A | 2/1997 | Artwick et al. |
| 5,610,665 A | 3/1997 | Berman |
| 5,612,710 A | 3/1997 | Christensen et al. |
| 5,614,961 A | 3/1997 | Gibeau et al. |
| 5,625,768 A | 4/1997 | Dye |
| 5,627,605 A | 5/1997 | Kim |
| 5,629,801 A | 5/1997 | Staker et al. |
| 5,630,037 A | 5/1997 | Schindler |
| 5,633,750 A | 5/1997 | Nogiwa et al. |
| 5,638,208 A | 6/1997 | Walker |
| 5,648,860 A | 7/1997 | Ooi et al. |
| 5,650,814 A | 7/1997 | Florent et al. |
| 5,651,104 A | 7/1997 | Cosman |
| 5,657,077 A | 8/1997 | DeAngelis et al. |
| 5,658,060 A | 8/1997 | Dove |
| 5,659,490 A | 8/1997 | Imamura |
| 5,659,671 A | 8/1997 | Tannenbaum et al. |
| 5,661,592 A | 8/1997 | Bornstein et al. |
| 5,661,593 A | 8/1997 | Engle |
| 5,665,942 A | 9/1997 | Williams et al. |
| 5,677,783 A | 10/1997 | Bloom et al. |
| 5,684,939 A | 11/1997 | Foran et al. |
| 5,684,943 A | 11/1997 | Abraham et al. |
| 5,689,437 A | 11/1997 | Nakagawa |
| 5,691,999 A | 11/1997 | Ball et al. |
| 5,694,180 A | 12/1997 | Deter et al. |
| 5,696,892 A | 12/1997 | Redmann et al. |
| 5,696,947 A | 12/1997 | Johns et al. |
| 5,699,497 A | 12/1997 | Erdahl et al. |
| 5,703,604 A | 12/1997 | McCutchen |
| 5,706,061 A | 1/1998 | Marshall et al. |
| 5,715,021 A | 2/1998 | Gibeau et al. |
| 5,719,951 A | 2/1998 | Shackleton et al. |
| 5,724,561 A | 3/1998 | Tarolli et al. |
| 5,726,785 A | 3/1998 | Chawki et al. |
| 5,734,386 A | 3/1998 | Cosman |
| 5,734,521 A | 3/1998 | Fukudome et al. |
| 5,739,819 A | 4/1998 | Bar-Nahum |
| 5,740,190 A | 4/1998 | Moulton |
| 5,742,749 A | 4/1998 | Foran et al. |
| 5,748,264 A | 5/1998 | Hegg |
| 5,748,867 A | 5/1998 | Cosman et al. |
| 5,761,709 A | 6/1998 | Kranich |
| 5,764,280 A | 6/1998 | Bloom et al. |
| 5,764,311 A | 6/1998 | Bonde et al. |
| 5,768,443 A | 6/1998 | Michael et al. |
| 5,781,666 A | 7/1998 | Ishizawa et al. |
| 5,793,912 A | 8/1998 | Boord et al. |
| 5,798,743 A | 8/1998 | Bloom |
| 5,808,797 A | 9/1998 | Bloom et al. |
| 5,818,456 A | 10/1998 | Cosman et al. |
| 5,818,998 A | 10/1998 | Harris et al. |
| 5,821,944 A | 10/1998 | Watkins |
| 5,825,363 A | 10/1998 | Anderson |
| 5,825,538 A | 10/1998 | Walker |
| 5,835,256 A | 11/1998 | Huibers |
| 5,837,996 A | 11/1998 | Keydar |
| 5,838,328 A | 11/1998 | Roller |
| 5,838,484 A | 11/1998 | Goossen |
| 5,841,443 A | 11/1998 | Einkauf |
| 5,841,447 A | 11/1998 | Drews |
| 5,841,579 A | 11/1998 | Bloom et al. |
| 5,850,225 A * | 12/1998 | Cosman ............ G06T 3/005 345/427 |
| 5,854,631 A | 12/1998 | Akeley et al. |
| 5,854,865 A | 12/1998 | Goldberg |
| 5,860,721 A | 1/1999 | Bowron et al. |
| 5,864,342 A | 1/1999 | Kajiya et al. |
| 5,867,166 A | 2/1999 | Myhrvold et al. |
| 5,867,301 A | 2/1999 | Engle |
| 5,870,097 A | 2/1999 | Snyder et al. |
| 5,870,098 A | 2/1999 | Gardiner |
| 5,874,967 A | 2/1999 | West et al. |
| 5,889,529 A | 3/1999 | Jones et al. |
| 5,900,881 A | 5/1999 | Ikedo |
| 5,903,272 A | 5/1999 | Otto |
| 5,905,504 A | 5/1999 | Barkans et al. |
| 5,908,300 A | 6/1999 | Walker et al. |
| 5,909,225 A | 6/1999 | Schinnerer et al. |
| 5,912,670 A | 6/1999 | Lipscomb et al. |
| 5,912,740 A | 6/1999 | Zare et al. |
| 5,917,495 A | 6/1999 | Doi et al. |
| 5,920,361 A | 7/1999 | Gibeau et al. |
| 5,923,333 A | 7/1999 | Stroyan |
| 5,930,740 A | 7/1999 | Mathisen |
| 5,943,060 A | 8/1999 | Cosman et al. |
| 5,946,129 A | 8/1999 | Xu et al. |
| 5,963,788 A | 10/1999 | Barron et al. |
| 5,969,699 A | 10/1999 | Balram et al. |
| 5,969,721 A | 10/1999 | Chen et al. |
| 5,969,726 A | 10/1999 | Rentschler et al. |
| 5,974,059 A | 10/1999 | Dawson |
| 5,977,977 A | 11/1999 | Kajiya et al. |
| 5,980,044 A | 11/1999 | Cannon et al. |
| 5,982,553 A | 11/1999 | Bloom et al. |
| 5,987,200 A | 11/1999 | Fleming et al. |
| 5,988,814 A | 11/1999 | Rohlfing et al. |
| 5,990,935 A | 11/1999 | Rohlfing |
| 5,999,549 A | 12/1999 | Freitag et al. |
| 6,002,454 A | 12/1999 | Kajiwara et al. |
| 6,002,505 A | 12/1999 | Kraenert et al. |
| 6,005,580 A | 12/1999 | Donovan |
| 6,005,611 A | 12/1999 | Gullichsen et al. |
| 6,014,144 A | 1/2000 | Nelson et al. |
| 6,014,163 A | 1/2000 | Houskeeper |
| 6,021,141 A | 2/2000 | Nam et al. |
| 6,031,541 A | 2/2000 | Lipscomb et al. |
| 6,034,739 A | 3/2000 | Rohlfing et al. |
| 6,038,057 A | 3/2000 | Brazas, Jr. et al. |
| 6,042,238 A | 3/2000 | Blackham et al. |
| 6,052,125 A | 4/2000 | Gardiner et al. |
| 6,052,485 A | 4/2000 | Nelson et al. |
| 6,057,909 A | 5/2000 | Yahav et al. |
| 6,064,392 A | 5/2000 | Rohner |
| 6,064,393 A | 5/2000 | Lengyel et al. |
| 6,069,903 A | 5/2000 | Zanger et al. |
| 6,072,500 A | 6/2000 | Foran et al. |
| 6,072,544 A | 6/2000 | Gleim et al. |
| 6,078,333 A | 6/2000 | Wittig et al. |
| 6,084,610 A | 7/2000 | Ozaki et al. |
| 6,094,226 A | 7/2000 | Ke et al. |
| 6,094,267 A | 7/2000 | Levenson et al. |
| 6,094,298 A | 7/2000 | Luo et al. |
| 6,100,906 A | 8/2000 | Asaro et al. |
| 6,101,036 A | 8/2000 | Bloom |
| 6,108,054 A | 8/2000 | Heizmann et al. |
| 6,111,616 A | 8/2000 | Chauvin et al. |
| 6,122,413 A | 9/2000 | Jiang et al. |
| 6,124,647 A | 9/2000 | Marcus et al. |
| 6,124,808 A | 9/2000 | Budnovitch |
| 6,124,922 A | 9/2000 | Sentoku |
| 6,124,989 A | 9/2000 | Oode et al. |
| 6,126,288 A | 10/2000 | Hewlett |
| 6,128,019 A | 10/2000 | Crocker, III et al. |
| 6,128,021 A | 10/2000 | van der Meulen et al. |
| 6,130,770 A | 10/2000 | Bloom |
| 6,134,339 A | 10/2000 | Luo |
| 6,137,565 A | 10/2000 | Ecke et al. |
| 6,137,932 A | 10/2000 | Kim et al. |
| 6,141,013 A | 10/2000 | Nelson et al. |
| 6,141,025 A | 10/2000 | Oka et al. |
| 6,141,034 A | 10/2000 | McCutchen |
| 6,144,481 A | 11/2000 | Kowarz et al. |
| 6,147,690 A | 11/2000 | Cosman |
| 6,147,695 A | 11/2000 | Bowen et al. |
| 6,147,789 A | 11/2000 | Gelbart |
| 6,154,259 A | 11/2000 | Hargis et al. |
| 6,175,579 B1 | 1/2001 | Sandford et al. |
| 6,184,888 B1 | 2/2001 | Yuasa et al. |
| 6,184,891 B1 | 2/2001 | Blinn |

(56) References Cited

U.S. PATENT DOCUMENTS

| | | |
|---|---|---|
| 6,184,926 B1 | 2/2001 | Khosravi et al. |
| 6,188,427 B1 | 2/2001 | Anderson et al. |
| 6,188,712 B1 | 2/2001 | Jiang et al. |
| 6,191,827 B1 | 2/2001 | Segman et al. |
| 6,195,099 B1 | 2/2001 | Gardiner |
| 6,195,484 B1 | 2/2001 | Brennan, III et al. |
| 6,195,609 B1 | 2/2001 | Pilley et al. |
| 6,204,859 B1 | 3/2001 | Jouppi et al. |
| 6,204,955 B1 | 3/2001 | Chao et al. |
| 6,215,579 B1 | 4/2001 | Bloom et al. |
| 6,219,015 B1 | 4/2001 | Bloom et al. |
| 6,222,937 B1 | 4/2001 | Cohen et al. |
| 6,229,650 B1 | 5/2001 | Reznichenko et al. |
| 6,229,827 B1 | 5/2001 | Fernald et al. |
| 6,233,025 B1 | 5/2001 | Wallenstein |
| 6,236,408 B1 | 5/2001 | Watkins |
| 6,240,220 B1 | 5/2001 | Pan et al. |
| 6,262,739 B1 | 7/2001 | Migdal et al. |
| 6,262,810 B1 | 7/2001 | Bloomer |
| 6,263,002 B1 | 7/2001 | Hsu et al. |
| 6,266,068 B1 | 7/2001 | Kang et al. |
| 6,268,861 B1 | 7/2001 | Sanz-Pastor et al. |
| 6,282,012 B1 | 8/2001 | Kowarz et al. |
| 6,282,220 B1 | 8/2001 | Floyd |
| 6,283,598 B1 | 9/2001 | Inami et al. |
| 6,285,407 B1 | 9/2001 | Yasuki et al. |
| 6,285,446 B1 | 9/2001 | Farhadiroushan |
| 6,292,165 B1 | 9/2001 | Lin et al. |
| 6,292,268 B1 | 9/2001 | Hirota et al. |
| 6,292,310 B1 | 9/2001 | Chao |
| 6,297,899 B1 | 10/2001 | Romanovsky |
| 6,298,066 B1 | 10/2001 | Wettroth et al. |
| 6,301,370 B1 | 10/2001 | Steffens et al. |
| 6,304,245 B1 | 10/2001 | Groenenboom |
| 6,307,558 B1 | 10/2001 | Mao |
| 6,307,663 B1 | 10/2001 | Kowarz |
| 6,308,144 B1 | 10/2001 | Bronfeld et al. |
| 6,320,688 B1 | 11/2001 | Westbrook et al. |
| 6,323,984 B1 | 11/2001 | Trisnadi |
| 6,333,792 B1 | 12/2001 | Kimura |
| 6,333,803 B1 | 12/2001 | Kurotori et al. |
| 6,335,765 B1 | 1/2002 | Daly et al. |
| 6,335,941 B1 | 1/2002 | Grubb et al. |
| 6,340,806 B1 | 1/2002 | Smart et al. |
| 6,356,683 B1 | 3/2002 | Hu et al. |
| 6,360,042 B1 | 3/2002 | Long |
| 6,361,173 B1 | 3/2002 | Vlahos et al. |
| 6,362,817 B1 | 3/2002 | Powers et al. |
| 6,362,818 B1 | 3/2002 | Gardiner et al. |
| 6,363,089 B1 | 3/2002 | Fernald et al. |
| 6,366,721 B1 | 4/2002 | Hu et al. |
| 6,369,936 B1 | 4/2002 | Moulin |
| 6,370,312 B1 | 4/2002 | Wagoner et al. |
| 6,374,011 B1 | 4/2002 | Wagoner et al. |
| 6,374,015 B1 | 4/2002 | Lin |
| 6,375,366 B1 | 4/2002 | Kato et al. |
| 6,381,072 B1 | 4/2002 | Burger |
| 6,381,385 B1 | 4/2002 | Watley et al. |
| 6,384,828 B1 | 5/2002 | Arbeiter et al. |
| 6,388,241 B1 | 5/2002 | Ang |
| 6,393,036 B1 | 5/2002 | Kato |
| 6,393,181 B1 | 5/2002 | Bulman et al. |
| 6,396,994 B1 | 5/2002 | Philipson et al. |
| 6,404,425 B1 | 6/2002 | Cosman |
| 6,407,736 B1 | 6/2002 | Regan |
| 6,411,425 B1 | 6/2002 | Kowarz et al. |
| 6,421,636 B1 | 7/2002 | Cooper et al. |
| 6,424,343 B1 | 7/2002 | Deering et al. |
| 6,429,876 B1 | 8/2002 | Morein |
| 6,429,877 B1 | 8/2002 | Stroyan |
| 6,433,823 B1 | 8/2002 | Nakamura et al. |
| 6,433,838 B1 | 8/2002 | Chen |
| 6,433,840 B1 | 8/2002 | Poppleton |
| 6,437,789 B1 | 8/2002 | Tidwell et al. |
| 6,445,362 B1 | 9/2002 | Tegreene |
| 6,445,433 B1 | 9/2002 | Levola |
| 6,449,071 B1 | 9/2002 | Farhan et al. |
| 6,449,293 B1 | 9/2002 | Pedersen et al. |
| 6,452,667 B1 | 9/2002 | Fernald et al. |
| 6,456,288 B1 | 9/2002 | Brockway et al. |
| 6,466,206 B1 | 10/2002 | Deering |
| 6,466,224 B1 | 10/2002 | Nagata et al. |
| 6,470,036 B1 | 10/2002 | Bailey et al. |
| 6,473,090 B1 | 10/2002 | Mayer |
| 6,476,848 B2 | 11/2002 | Kowarz et al. |
| 6,480,513 B1 | 11/2002 | Kapany et al. |
| 6,480,634 B1 | 11/2002 | Corrigan |
| 6,490,931 B1 | 12/2002 | Fernald et al. |
| 6,496,160 B1 | 12/2002 | Tanner et al. |
| 6,507,706 B1 | 1/2003 | Brazas et al. |
| 6,510,272 B1 | 1/2003 | Wiegand |
| 6,511,182 B1 | 1/2003 | Agostinelli et al. |
| 6,512,892 B1 | 1/2003 | Montgomery et al. |
| RE37,993 E | 2/2003 | Zhang |
| 6,519,388 B1 | 2/2003 | Fernald et al. |
| 6,522,809 B1 | 2/2003 | Takabayashi et al. |
| 6,525,740 B1 | 2/2003 | Cosman |
| 6,529,310 B1 | 3/2003 | Huibers et al. |
| 6,529,531 B1 | 3/2003 | Everage et al. |
| 6,534,248 B2 | 3/2003 | Jain et al. |
| 6,538,656 B1 | 3/2003 | Cheung et al. |
| 6,549,196 B1 | 4/2003 | Taguchi et al. |
| 6,554,431 B1 | 4/2003 | Binsted et al. |
| 6,556,627 B2 | 4/2003 | Kitamura et al. |
| 6,563,968 B2 | 5/2003 | Davis et al. |
| 6,574,352 B1 | 6/2003 | Skolmoski |
| 6,575,581 B2 | 6/2003 | Tsurushima |
| 6,577,429 B1 | 6/2003 | Kurtz et al. |
| 6,580,430 B1 | 6/2003 | Hollis et al. |
| 6,591,020 B1 | 7/2003 | Klassen |
| 6,594,043 B1 | 7/2003 | Bloom et al. |
| 6,597,363 B1 | 7/2003 | Duluk, Jr. et al. |
| 6,598,979 B2 | 7/2003 | Yoneno |
| 6,600,460 B1 | 7/2003 | Mays, Jr. |
| 6,600,830 B1 | 7/2003 | Lin et al. |
| 6,600,854 B2 | 7/2003 | Anderegg et al. |
| 6,603,482 B1 | 8/2003 | Tidwell |
| 6,643,299 B1 | 11/2003 | Lin |
| 6,646,645 B2 | 11/2003 | Simmonds et al. |
| 6,650,326 B1 | 11/2003 | Huber et al. |
| 6,671,293 B2 | 12/2003 | Kopp et al. |
| 6,678,085 B2 | 1/2004 | Kowarz et al. |
| 6,690,655 B1 | 2/2004 | Miner et al. |
| 6,692,129 B2 | 2/2004 | Gross et al. |
| 6,711,187 B2 | 3/2004 | Tanner et al. |
| 6,727,918 B1 | 4/2004 | Nason |
| 6,738,105 B1 | 5/2004 | Hannah et al. |
| 6,741,384 B1 | 5/2004 | Martin et al. |
| 6,747,649 B1 | 6/2004 | Sanz-Pastor et al. |
| 6,747,781 B2 | 6/2004 | Trisnadi |
| 6,751,001 B1 | 6/2004 | Tanner et al. |
| 6,760,036 B2 | 7/2004 | Tidwell |
| 6,763,042 B2 | 7/2004 | Williams et al. |
| 6,773,142 B2 | 8/2004 | Rekow |
| 6,776,045 B2 | 8/2004 | Fernald et al. |
| 6,782,205 B2 | 8/2004 | Trisnadi et al. |
| 6,788,304 B2 | 9/2004 | Hart et al. |
| 6,788,307 B2 | 9/2004 | Coleman et al. |
| 6,789,903 B2 | 9/2004 | Parker et al. |
| 6,791,562 B2 | 9/2004 | Cosman et al. |
| 6,793,350 B1 | 9/2004 | Raskar et al. |
| 6,798,418 B1 | 9/2004 | Sartori et al. |
| 6,799,850 B2 | 10/2004 | Hong et al. |
| 6,801,205 B2 | 10/2004 | Gardiner et al. |
| 6,809,731 B2 | 10/2004 | Muffler et al. |
| 6,811,267 B1 | 11/2004 | Allen et al. |
| 6,816,169 B2 | 11/2004 | Cosman |
| 6,831,648 B2 | 12/2004 | Mukherjee et al. |
| 6,840,627 B2 | 1/2005 | Olbrich |
| 6,842,298 B1 | 1/2005 | Shafer et al. |
| 6,856,449 B2 | 2/2005 | Winkler et al. |
| 6,868,212 B2 | 3/2005 | DeWitte et al. |
| 6,871,958 B2 | 3/2005 | Streid et al. |
| 6,897,878 B2 | 5/2005 | Cosman et al. |

(56) References Cited

U.S. PATENT DOCUMENTS

| | | |
|---|---|---|
| 6,943,803 B1 | 9/2005 | Cosman et al. |
| 6,956,582 B2 | 10/2005 | Tidwell |
| 6,956,878 B1 | 10/2005 | Trisnadi |
| 6,971,576 B2 | 12/2005 | Tsikos et al. |
| 6,984,039 B2 | 1/2006 | Agostinelli |
| 6,985,663 B2 | 1/2006 | Catchmark et al. |
| 7,012,669 B2 | 3/2006 | Streid et al. |
| 7,030,883 B2 | 4/2006 | Thompson |
| 7,038,735 B2 | 5/2006 | Coleman et al. |
| 7,043,102 B2 | 5/2006 | Okamoto et al. |
| 7,053,911 B2 | 5/2006 | Cosman |
| 7,053,912 B2 | 5/2006 | Cosman |
| 7,053,913 B2 | 5/2006 | Cosman |
| 7,054,051 B1 | 5/2006 | Bloom |
| 7,091,980 B2 | 8/2006 | Tidwell |
| 7,095,423 B2 | 8/2006 | Cosman et al. |
| 7,110,153 B2 | 9/2006 | Sakai |
| 7,110,624 B2 | 9/2006 | Williams et al. |
| 7,111,943 B2 | 9/2006 | Agostinelli et al. |
| 7,113,320 B2 | 9/2006 | Tanner |
| 7,133,583 B2 | 11/2006 | Marceau et al. |
| 7,169,630 B2 | 1/2007 | Moriwaka |
| 7,193,765 B2 | 3/2007 | Christensen et al. |
| 7,193,766 B2 | 3/2007 | Bloom |
| 7,197,200 B2 | 3/2007 | Marceau et al. |
| 7,210,786 B2 | 5/2007 | Tamura et al. |
| 7,215,840 B2 | 5/2007 | Marceau et al. |
| 7,237,916 B2 | 7/2007 | Mitomori |
| 7,257,519 B2 | 8/2007 | Cosman |
| 7,267,442 B2 | 9/2007 | Childers et al. |
| 7,277,216 B2 | 10/2007 | Bloom |
| 7,286,277 B2 | 10/2007 | Bloom et al. |
| 7,317,464 B2 | 1/2008 | Willis |
| 7,327,909 B2 | 2/2008 | Marceau et al. |
| 7,334,902 B2 | 2/2008 | Streid et al. |
| 7,354,157 B2 | 4/2008 | Takeda et al. |
| 7,364,309 B2 | 4/2008 | Sugawara et al. |
| 7,400,449 B2 | 7/2008 | Christensen et al. |
| 7,420,177 B2 | 9/2008 | Williams et al. |
| 7,583,437 B2 | 9/2009 | Lipton et al. |
| 7,594,965 B2 | 9/2009 | Tanaka |
| 2001/0002124 A1 | 5/2001 | Mamiya et al. |
| 2001/0027456 A1 | 10/2001 | Lancaster et al. |
| 2001/0047251 A1 | 11/2001 | Kemp |
| 2002/0005862 A1 | 1/2002 | Deering |
| 2002/0021462 A1 | 2/2002 | Delfyett et al. |
| 2002/0030769 A1 | 3/2002 | Bae |
| 2002/0042674 A1 | 4/2002 | Mochizuki et al. |
| 2002/0067465 A1 | 6/2002 | Li |
| 2002/0067467 A1 | 6/2002 | Dorval et al. |
| 2002/0071453 A1 | 6/2002 | Lin |
| 2002/0075202 A1 | 6/2002 | Fergason |
| 2002/0101647 A1 | 8/2002 | Moulin |
| 2002/0136121 A1 | 9/2002 | Salmonsen et al. |
| 2002/0145615 A1 | 10/2002 | Moore |
| 2002/0145806 A1 | 10/2002 | Amm |
| 2002/0146248 A1 | 10/2002 | Herman et al. |
| 2002/0154860 A1 | 10/2002 | Fernald et al. |
| 2002/0176134 A1 | 11/2002 | Vohra |
| 2002/0196414 A1 | 12/2002 | Manni et al. |
| 2003/0035190 A1 | 2/2003 | Brown et al. |
| 2003/0038807 A1 | 2/2003 | Demos et al. |
| 2003/0039443 A1 | 2/2003 | Catchmark et al. |
| 2003/0048275 A1 | 3/2003 | Ciolac |
| 2003/0081303 A1 | 5/2003 | Sandstrom et al. |
| 2003/0086647 A1 | 5/2003 | Willner et al. |
| 2003/0142319 A1 | 7/2003 | Ronnekleiv et al. |
| 2003/0160780 A1 | 8/2003 | Lefebvre et al. |
| 2003/0174312 A1 | 9/2003 | Leblanc |
| 2003/0214633 A1 | 11/2003 | Roddy et al. |
| 2003/0235304 A1 | 12/2003 | Evans et al. |
| 2004/0017518 A1 | 1/2004 | Stern et al. |
| 2004/0017608 A1* | 1/2004 | Lantz ............ G03B 21/00 359/451 |
| 2004/0085283 A1 | 5/2004 | Wang |
| 2004/0136074 A1 | 7/2004 | Ford et al. |
| 2004/0165154 A1 | 8/2004 | Kobori et al. |
| 2004/0179007 A1 | 9/2004 | Bower et al. |
| 2004/0183954 A1 | 9/2004 | Hannah et al. |
| 2004/0184013 A1 | 9/2004 | Raskar et al. |
| 2004/0196660 A1 | 10/2004 | Usami |
| 2004/0207618 A1 | 10/2004 | Williams et al. |
| 2005/0018309 A1 | 1/2005 | McGuire, Jr. et al. |
| 2005/0024722 A1 | 2/2005 | Agostinelli et al. |
| 2005/0047134 A1 | 3/2005 | Mueller et al. |
| 2005/0093854 A1 | 5/2005 | Kennedy et al. |
| 2005/0243389 A1 | 11/2005 | Kihara |
| 2006/0039051 A1 | 2/2006 | Baba et al. |
| 2006/0114544 A1 | 6/2006 | Bloom et al. |
| 2006/0176912 A1 | 8/2006 | Anikitchev |
| 2006/0221429 A1 | 10/2006 | Christensen et al. |
| 2006/0238851 A1 | 10/2006 | Bloom |
| 2006/0255243 A1 | 11/2006 | Kobayashi et al. |
| 2007/0183473 A1 | 8/2007 | Bicknell et al. |
| 2008/0037125 A1 | 2/2008 | Takamiya |
| 2008/0218837 A1 | 9/2008 | Yang et al. |
| 2012/0019528 A1* | 1/2012 | Ugawa ............ G09G 3/003 345/419 |
| 2012/0069143 A1* | 3/2012 | Chu ............ H04N 13/0022 348/43 |
| 2012/0133748 A1* | 5/2012 | Chung ............ H04N 13/0011 348/51 |
| 2013/0257857 A1* | 10/2013 | Kakizawa ............ G06F 3/04815 345/419 |
| 2014/0300708 A1* | 10/2014 | Iversen ............ G02B 27/0025 348/51 |
| 2015/0163475 A1* | 6/2015 | Krisman ............ H04N 13/0022 348/54 |

FOREIGN PATENT DOCUMENTS

| | | |
|---|---|---|
| EP | 0 155 858 | 9/1985 |
| EP | 0 306 308 | 3/1989 |
| EP | 0 319 165 | 6/1989 |
| EP | 0 417 039 | 3/1991 |
| EP | 0 480 570 | 4/1992 |
| EP | 0 488 326 | 6/1992 |
| EP | 0 489 594 | 6/1992 |
| EP | 0 528 646 | 2/1993 |
| EP | 0 530 760 | 3/1993 |
| EP | 0 550 189 | 7/1993 |
| EP | 0 610 665 | 8/1994 |
| EP | 0 621 548 | 10/1994 |
| EP | 0 627 644 | 12/1994 |
| EP | 0 627 850 | 12/1994 |
| EP | 0 643 314 | 3/1995 |
| EP | 0 654 777 | 5/1995 |
| EP | 0 658 868 | 6/1995 |
| EP | 0 689 078 | 12/1995 |
| EP | 0 801 319 | 10/1997 |
| EP | 0 880 282 | 11/1998 |
| EP | 1 365 584 | 11/2003 |
| GB | 2 118 365 | 10/1983 |
| GB | 2 144 608 | 3/1985 |
| GB | 2 179 147 | 2/1987 |
| GB | 2 245 806 | 1/1992 |
| GB | 2 251 770 | 7/1992 |
| GB | 2 251 773 | 7/1992 |
| GB | 2 266 385 | 10/1993 |
| GB | 2 293 079 | 3/1996 |
| JP | 63-305323 | 12/1988 |
| JP | 2-219092 | 8/1990 |
| JP | 2000305481 | 11/2000 |
| WO | 87/01571 | 3/1987 |
| WO | 92/12506 | 7/1992 |
| WO | 93/02269 | 2/1993 |
| WO | 93/09472 | 5/1993 |
| WO | 93/18428 | 9/1993 |
| WO | 95/11473 | 4/1995 |
| WO | 95/27267 | 10/1995 |
| WO | 96/41217 | 12/1996 |
| WO | 96/41224 | 12/1996 |
| WO | 97/26569 | 7/1997 |

(56) References Cited

FOREIGN PATENT DOCUMENTS

| WO | 98/15127 | 4/1998 |
|---|---|---|
| WO | 01/46248 | 6/2001 |
| WO | 01/57581 | 8/2001 |
| WO | 02/12925 | 2/2002 |
| WO | 02/23824 | 3/2002 |
| WO | 02/31575 | 4/2002 |
| WO | 03/001281 | 1/2003 |

OTHER PUBLICATIONS

Halevi, "Bimorph piezoelectric flexible mirror: graphical solution and comparison with experiment," J. Opt. Soc. Am., Jan. 1983, pp. 110-113, vol. 73, No. 1.
Hanbury, "The Taming of the Hue, Saturation and Brightness Colour Space," Centre de Morphologie Mathematique, Ecole des Mines de Paris, date unknown, pp. 234-243.
Hearn et al., Computer Graphics, 2nd ed., 1994, pp. 143-181.
Heckbert, "Survey of Texture Mapping," IEEE Computer Graphics and Applications, Nov. 1986, pp. 56-67.
Heckbert, "Texture Mapping Polygons in Perspective," New York Institute of Technology, Computer Graphics Lab, Technical Memo No. 13, Apr. 28, 1983.
Heidrich et al., "Applications of Pixel Textures in Visualization and Realistic Image Synthesis," Symposium on INteractive 3D Graphics, 1990, pp. 127-135, Atlanta, Georgia.
Holten-Lund, Design for Scalability in 3D Computer Graphics Architectures, Ph.D. thesis, Computer Science sand Technology Informatics and Mathematical Modelling, Technical University of Denmark, Jul. 2001.
Integrating Sphere, www.crowntech.-inc.com, 010-82781750/ 82782352/68910917, date unknown.
INTEL740 Graphics Accelerator Datasheet, Apr. 1998.
INTEL470 Graphics Accelerator Datasheet, Architectural Overview, at least as early as Apr. 30, 1998.
Jacob, "Eye Tracking in Advanced Interface Design," ACM, 1995.
Kelley et al., "Hardware Accelerated Rendering of CSG and Transparency," SIGGRAPH '94, in Computer Graphics Proceedings, Annual Conference Series, 1994, pp. 177-184.
Klassen, "Modeling the Effect of the Atmosphere on Light," ACM Transactions on Graphics, Jul. 1987, pp. 215-237, vol. 6, No. 3.
Kleiss, "Tradeoffs Among Types of Scene Detail for Simulating Low-Altitude Flight," University of Dayton Research Institute, Aug. 1, 1992, pp. 1141-1146.
Kudryashov et al., "Adaptive Optics for High Power Laser ZBeam Control," Springer Proceedings in Physics, 2005, pp. 237-248, vol. 102.
Lewis, "Algorithms for Solid Noise Synthesis," SIGGRAPH '89, Computer Graphics, Jul. 1989, pp. 263-270, vol. 23, No. 3.
Lindstrom et al., "Real-Time, Continuous Level of Detail Rendering of Height Fields," SIGGRAPH '96, Aug. 1996.
McCarty et al., "A Virtual Cockpit for a Distributed Interactive Simulation," IEEE Computer Graphics & Applications, Jan. 1994, pp. 49-54.
Microsoft Flight Simulator 2004, Aug. 9, 2000. http://www.microsoft.com/games/flightsimulator/fs2000_devdesk.sdk.asp.
Miller et al., "Illumination and Reflection Maps: Simulated Objects in Simulated and Real Environments," SIGGRAPH '84, Course Notes for Advances Computer Graphics Animation, Jul. 23, 1984.
Mitchell, "Spectrally Optimal Sampling for Distribution Ray Tracing," SIGGRAPH '91, Computer Graphics, Jul. 1991, pp. 157-165, vol. 25, No. 4.
Mitsubishi Electronic Device Group, "Overview of 3D-RAM and Its Functional Blocks," 1995.
Montrym et al., "InfiniteReality: A Real-Time Graphics System," Computer Graphics Proceedings, Annual Conference Series, 1997.
Mooradian et al., "High Power Extended Vertical Cavity Surface Emitting Diode Lasers and Arrays and Their Applications," Micro-Optics Conference, Tokyo, Nov. 2, 2005.

Musgrave et al., "The Synthesis and Rendering of Eroded Fractal Terrains," SIGGRAPH '89, Computer Graphics, Jul. 1989, pp. 41-50, vol. 23, No. 3.
Nakamae et al., "Compositing 3D Images with Antialiasing and Various Shading Effects," IEEE Computer Graphics Applications, Mar. 1989, pp. 21-29, vol. 9, No. 2.
Newman et al., Principles of Interactive Computer Graphics, 2nd ed., 1979, McGraw-Hill Book Company, San Francisco, California.
Niven, "Trends in Laser Light Sources for Projection Display," Novalux International Display Workshop, Session LAD2-2, Dec. 2006.
Oshima et al., "An Animation Design Tool Utilizing Texture," International Workshop on Industrial Applications of Machine Intelligence and Vision, Tokyo, Apr. 10-12, 1989, pp. 337-342.
Parke, "Simulation and Expected Performance Analysis of Multiple Processor Z-Buffer Systems," Computer Graphics, 1980, pp. 48-56.
Peachey, "Solid Texturing of Complex Surfaces," SIGGRAPH '85, 1985, pp. 279-286, vol. 19, No. 3.
Peercy et al., "Efficient Bump Mapping Hardware," Computer Graphics Proceedings, 1997.
Perlin, "An Image Synthesizer," SIGGRAPH '85, 1985, pp. 287-296, vol. 19, No. 3.
Pineda, "A Parallel Algorithm for Polygon Rasterization," SIGGRAPH '88, Aug. 1988, pp. 17-20, vol. 22, No. 4.
Polis et al., "Automating the Construction of Large Scale Virtual Worlds," Digital Mapping Laboratory, School of Computer Science, Carnegie Mellon University, date unknown.
Porter et al., "Compositing Digital Images," SIGGRAPH '84, Computer Graphics, Jul. 1984, pp. 253-259, vol. 18, No. 3.
Poulton et al., "Breaking the Frame-Buffer Bottleneck with Logic-Enhanced Memories," IEEE Computer Graphics Applications, Nov. 1992, pp. 65-74.
Rabinovich et al., "Visualization of Large Terrains in Resource-Limited Computing Environments," Computer Science Department, Technion—Israel Institute of Technology, pp. 95-102, date unknown.
Reeves et al., "Rendering Antialiased Shadows with Depth Maps," SIGGRAPH '87, Computer Graphics, Jul. 1987, pp. 283-291, vol. 21, No. 4.
Regan et al., "Priority Rendering with a Virtual Reality Address Recalculation Pipeline," Computer Graphics Proceedings, Annual Conference Series, 1994.
Rhoades et al., "Real-Time Procedural Textures," ACM, Jun. 1992, pp. 95-100, 225.
Rockwood et al., "Blending Surfaces in Solid Modeling," Geometric Modeling: Algorithms and New Trends, 1987, pp. 367-383, Society for Industrial and Applied Mathematics, Philadelphia, Pennsylvania.
Röttger et al., "Real-Time Generation of Continuous Levels of Detail for Height Fields," WSCG '98, 1998.
Safronov, "Bimorph Adaptive Optics: Elements, Technology and Design Principles," SPIE, 1996, pp. 494-504, vol. 2774.
Saha et al., "Web-based Distributed VLSI Design," IEEE, 1997, pp. 449-454.
Salzman et al., "VR's Frames of Reference: A Visualization Technique for Mastering Abstract Multidimensional Information," CHI 99 Papers, May 1999, pp. 489-495.
Sandejas, Silicon Microfabrication of Grating Light Valves, Doctor of Philosophy Dissertation, Stanford University, Jul. 1995.
Scarlatos, "A Refined Triangulation Hierarchy for Multiple Levels of Terrain Detail," presented at the IMAGE V Conference, Phoenix, Arizona, Jun. 19-22, 1990, pp. 114-122.
Schilling, "A New Simple and Efficient Antialiasing with Subpixel Masks," SIGGRAPH '91, Computer Graphics, Jul. 1991, pp. 133-141, vol. 25, No. 4.
Schumacker, "A New Visual System Architecture," Proceedings of the Second Interservices/Industry Training Equipment Conference, Nov. 18-20, 1990, Salt Lake City, Utah.
Segal et al., "Fast Shadows and Lighting Effects Using Texture Mapping," SIGGRAPH '92, Computer Graphics, Jul. 1992, pp. 249-252, vol. 26, No. 2.
SICK AG, S3000 Safety Laser Scanner Operating Instructions, Aug. 25, 2005.

(56) References Cited

OTHER PUBLICATIONS

Silicon Light Machines, "White Paper: Calculating Response Characteristics for the "Janis" GLV Module, Revision 2.0," Oct. 1999.
Solgaard, "Integrated Semiconductor Light Modulators for Fiber-Optic and Display Applications," Ph.D. Dissertation submitted to the Deparatment of Electrical Engineering and the Committee on Graduate Studies of Stanford University, Feb. 1992.
Sollberger et al., "Frequency Stabilization of Semiconductor Lasers for Applications in Coherent Communication Systems," Journal of Lightwave Technology, Apr. 1987, pp. 485-491, vol. LT-5, No. 4.
Steinhaus et al., "Bimorph Piezoelectric Flexible Mirror," Journal of the Optical Society of America, Mar. 1979, pp. 478-481, vol. 69, No. 3.
Stevens et al., "The National Simulation Laboratory: The Unifying Tool for Air Traffic Control System Development," Proceedings of the 1991 Winter Simulation Conference, 1991, pp. 741-746.
Stone, "High-Performance Computer Architecture," 1987, pp. 278-330, Addison-Wesley Publishing Company, Menlo Park, California.
Tanner et al., "The Clipmap: A Virtual Mipmap," Silicon Graphics Computer Systems; Proceedings of the 25th Annual Conference on Computer Graphics and Interactive Techniques, Jul. 1998.
Tanriverdi et al., "Interacting with Eye Movements in Virtual Environments," CHI Letters, Apr. 2000, pp. 265-272, vol. 2, No. 1.
Texas Instruments, DLP® 3-D HDTV Technology, 2007.
Torborg et al., "Talisman: Commodity Realtime 3D Graphics for the PC," Computer Graphics Proceedings, Annual Conference Series, 1996, pp. 353-363.
Trisnadi, "Hadamard Speckle Contrast Reduction," Optics Letters, 2004, vol. 29, pp. 11-13.
Trisnadi et al., "Overview and Applications of Grating Light Valve™ Based Optical Write Engines for High-Speed Digital Imaging," proceedings of conference "MOEMS Display and Imaging Systems II," Jan. 2004, vol. 5328.
Tseng et al., "Development of an Aspherical Bimorph PZT Mirror Bender with Thin Film Resistor Electrode," Advanced Photo Source, Argonne National Laboratory, Sep. 2002, pp. 271-278.
Vinevich et al., "Cooled and Uncooled Single-Channel Deformable Mirrors for Industrial Laser Systems," Quantum Electronics, 1998, pp. 366-369, vol. 28, No. 4.
Whitton, "Memory Design for Raster Graphics Displays," IEEE Computer Graphics & Applications, Mar. 1984, pp. 48-65.
Williams, "Casting Curved Shadows on Curved Surfaces," Computer Graphics Lab, New York Institute of Technology, 1978, pp. 270-274.
Williams, "Pyramidal Parametrics," Computer Graphics, Jul. 1983, pp. 1-11, vol. 17, No. 3.
Willis et al., "A Method for Continuous Adaptive Terrain," Presented at the 1996 IMAGE Conference, Jun. 23-28, 1996.
Woo et al., "A Survey of Shadow Algorithms," IEEE Computer Graphics & Applications, Nov. 1990, pp. 13-32, vol. 10, No. 6.
Wu et al., "A Differential Method for Simultaneous Estimation of Rotation, Change of Scale and Translation," Signal Processing: Image Communication, 1990, pp. 69-80, vol. 2, No. 1.
Youbing et al., "A Fast Algorithm for Large Scale Terrain Walkthrough," CAD/Graphics, Aug. 22-24, 2001.
Abrash, "The Quake Graphics Engine," CGDC Quake Talk taken from Computer Game Developers Conference, Apr. 2, 1996. http://gamers.org/dEngine/quake/papers/mikeab-cgdc.html.
Akeley, "RealityEngine Graphics," Computer Graphics Proceedings, Annual Conference Series, 1993.
Allen, J. et al., "An Interactive Learning Environment for VLSI Design," Proceedings of the IEEE, Jan. 2000, pp. 96-106, vol. 88, No. 1.
Allen, W. et al., "47.4: Invited Paper: Wobulation: Doubling the Addressed Resolution of Projection Displays," SID 05 Digest, 2005, pp. 1514-1517.
Amm, et al., "5.2: Grating Light Valve™ Technology: Update and Novel Applications," Presented at Society for Information Display Symposium, May 19, 1998, Anaheim, California.
Apgar et al., "A Display System for the Stellar™ Graphics Supercomputer Model GS1000T™," Computer Graphics, Aug. 1988, pp. 255-262, vol. 22, No. 4.
Apte, "Grating Light Valves for High-Resolution Displays," Ph.D. Dissertation—Stanford University, 1994 (abstract only).
Baer, Computer Systems Architecture, 1980, Computer Science Press, Inc., Rockville, Maryland.
Barad et al., "Real-Time Procedural Texturing Techniques Using MMX," Gamasutra, May 1, 1998, http://www.gamasutra.com/features/19980501/mmxtexturing_01.htm.
Bass, "4K GLV Calibration," E&S Company, Jan. 8, 2008.
Becker et al., "Smooth Transitions between Bump Rendering Algorithms," Computer Graphics Proceedings, 1993, pp. 183-189.
Bishop et al., "Frameless Rendering: Double Buffering Considered Harmful," Computer Graphics Proceedings, Annual Conference Series, 1994.
Blinn, "Simulation of Wrinkled Surfaces," Siggraph '78 Proceedings, 1978, pp. 286-292.
Blinn, "A Trip Down the Graphics Pipeline: Subpixelic Particles," IEEE Computer Graphics & Applications, Sep./Oct. 1991, pp. 86-90, vol. 11, No. 5.
Blinn et al., "Texture and Reflection in Computer Generated Images," Communications of the ACM, Oct. 1976, pp. 542-547, vol. 19, No. 10.
Bloom, "The Grating Light Valve: revolutionizing display technology," Silicon Light Machines, date unknown.
Boyd et al., "Parametric Interaction of Focused Gaussian Light Beams," Journal of Applied Physics, Jul. 1968, pp. 3597-3639 vol. 39, No. 8.
Brazas et al., "High-Resolution Laser-Projection Display System Using a Grating Electromechanical System (GEMS)," MOEMS Display and Imaging Systems II, Proceedings of SPIE, 2004, pp. 65-75vol. 5348.
Bresenham, "Algorithm for Computer Control of a Digital Plotter," IBM Systems Journal, 1965, pp. 25-30, vol. 4, No. 1.
Carlson, "An Algorithm and Data Structure for 3D Object Synthesis Using Surface Patch Intersections," Computer Graphics, Jul. 1982, pp. 255-263, vol. 16, No. 3.
Carpenter, "The A-buffer, an Antialiased Hidden Surface Method," Computer Graphics, Jul. 1984, pp. 103-108, vol. 18, No. 3.
Carter, "Re: Re seams and creaseAngle (long)," posted on the GeoVRML.org website Feb. 2, 2000, http://www.ai.sri.com/geovrml/archive/msg00560.html.
Catmull, "An Analytic Visible Surface Algorithm for Independent Pixel Processing," Computer Graphics, Jul. 1984, pp. 109-115, vol. 18, No. 3.
Chasen, "Geometric Principles and Procedures for Computer Graphic Applications," 1978, pp. 11-123, Upper Saddle River, New Jersey.
Choy et al., "Single Pass Algorithm for the Generation of Chain-Coded Contours and Contours Inclusion Relationship," Communications, Computers and Signal Processing—IEEE Pac Rim '93, 1993, pp. 256-259.
Clark et al., "Photographic Texture and CIG: Modeling Strategies for Production Data Bases," 9th VITSC Proceedings, Nov.-Dec., 1987, pp. 274-283.
Corbin et al., "Grating Light Valve™ and Vehicle Displays," Silicon Light Machines, Sunnyvale, California, date unknown.
Corrigan et al., "Grating Light Valve™ Technology for Projection Displays," Presented at the International Display Workshop—Kobe, Japan, Dec. 9, 1998.
Crow, "Shadow Algorithms for Computer Graphics," Siggraph '77, Jul. 1977, San Jose, California, pp. 242, 248.
Deering et al., "FBRAM: A New Form of Memory Optimized for 3D Graphics," Computer Graphics Proceedings, Annual Conference Series, 1994.
Drever et al., "Laser Phase and Frequency Stabilization Using an Optical Resonator," Applied Physics B: Photophysics and Laser Chemistry, 1983, pp. 97-105, vol. 31.
Duchaineau et al., "ROAMing Terrain: Real-Time Optimally Adapting Meshes," Los Alamos National Laboratory and Lawrence Livermore National Laboratory, 1997.
Duff, "Compositing 3-D Rendered Images," Siggraph '85, Jul. 22-26, 1985, San Francisco, California, pp. 41-44.

(56) References Cited

OTHER PUBLICATIONS

Ellis, "Low-Cost Bimorph Mirrors in Adaptive Optics," Ph.D. Thesis, Imperial College of Science, Technology and Medicine—University of London, 1999.

Faux et al., Computational Geometry for Design and Manufacture, 1979, Ellis Horwood, Chicester, United Kingdom.

Feiner et al., "Dial: A Diagrammatic Animation Language," IEEE Computer Graphics & Applications, Sep. 1982, pp. 43-54, vol. 2, No. 7.

Fiume et al., "A Parallel Scan Conversion Algorithm with Anti-Aliasing for a General-Purpose Ultracomputer," Computer Graphics, Jul. 1983, pp. 141-150, vol. 17, No. 3.

Foley et al., "Computer Graphics: Principles and Practice," 2nd ed., 1990, Addison-Wesley Publishing Co., Inc., Menlo Park, California.

Foley et al., "Fundamentals of Interactive Computer Graphics," 1982, Addison-Wesley Publishing Co., Inc., Menlo Park, California.

Fox et al., "Development of Computer-Generated Imagery for a Low-Cost Real-Time Terrain Imaging System," IEEE 1986 National Aerospace and Electronic Conference, May 19-23, 1986, pp. 986-991.

Gambotto, "Combining Image Analysis and Thermal Models for Infrared Scene Simulations," Image Processing Proceedings, ICIP-94, IEEE International Conference, 1994, vol. 1, pp. 710-714.

Gardiner, "A Method for Rendering Shadows," E&S Company, Sep. 25, 1996.

Gardiner, "Shadows in Harmony," E&S Company, Sep. 20, 1996.

Gardner, "Simulation of Natural Scenes Using Textured Quadric Surfaces," Computer Graphics, Jul. 1984, pp. 11-20, vol. 18, No. 3.

Gardner, "Visual Simulation of Clouds," Siggraph '85, Jul. 22-26, 1985, San Francisco, California, pp. 297-303.

Giloi, Interactive Computer Graphics: Data Structures, Algorithms, Languages, 1978, Prentice-Hall, Inc., Englewood Cliffs, New Jersey.

Glaskowsky, "Intel Displays 740 Graphics Chip: Auburn Sets New Standard for Quality—But Not Speed," Microprocessor Report, Feb. 16, 1998, pp. 5-9, vol. 12, No. 2.

Goshtasby, "Registration of Images with Geometric Distortions," IEEE Transactions on Geoscience and Remote Sensing, Jan. 1988, pp. 60-64, vol. 26, No. 1.

Great Britain Health & Safety Executive, The Radiation Safety of Lasers Used for Display Purposes, Oct. 1996.

Gupta et al., "Filtering Edges for Gray-Scale Displays," Computer Graphics, Aug. 1981, pp. 1-5, vol. 15, No. 3.

\* cited by examiner

SYSTEM AND METHOD FOR DISPLAYING IMAGES IN 3-D STEREO

CROSS-REFERENCE TO RELATED APPLICATIONS

This application is a continuation of U.S. patent application Ser. No. 13/545,948, filed on Jul. 10, 2012, titled SYSTEM AND METHOD FOR DISPLAYING DISTANT 3-D STEREO ON A DOME SURFACE, now U.S. Pat. No. 9,641,826, issued May 2, 2017 ("the '948 Application"), which claims the benefit of the Oct. 6, 2011 filing date U.S. Provisional Patent Application No. 61/544,110 and of the Oct. 12, 2011 filing date of U.S. Provisional Patent Application No. 61/546,152 pursuant to 35 U.S.C. § 119(e). The entire disclosure of each of the foregoing patent applications is hereby incorporated herein.

TECHNICAL FIELD

The present disclosure relates generally to generating images for display, and more particularly, but not necessarily entirely, to a method and system for generating 3-D images for display.

RELATED ART

Stereopsis is the visual ability to perceive the world in three dimensions (3-D). Stereopsis in humans is primarily achieved by the horizontal offset, known as interocular offset, between the two eyes. Interocular offset leads to two slightly different projections of the world onto the retinas of the two eyes. The human mind perceives the viewed object in 3-D from the two slightly different projections projected onto the two retinas.

One of the main ways in which human eyes perceive distance is called parallax. Parallax is an apparent displacement or difference in the apparent position of an object viewed along two different lines of sight. Nearby objects have a larger parallax than more distant objects when observed from different positions, so parallax can be used to determine distances. In humans, the two eyes have overlapping visual fields that use parallax to gain depth perception; that is, each eye views the object along a different line of sight. The brain exploits the parallax due to the different view from each eye to gain depth perception and estimate distances to objects.

This same method of parallax is used to give the illusion of distance in 3-D stereo images, including still images, videos, and movies, whether captured by camera or computer generated. 3-D stereo images simulate real-world perception by displaying a slightly different image for each eye—a slightly different perspective of the same scene—where the viewing position is offset slightly in the horizontal direction (interocular distance). The two images that are displayed independently to the right and left eyes are sometime referred to as a "stereo pair."

There are many methods for displaying a different image to each eye to generate the perception of a 3-D image. For still images, display methods may include a lenticular display surface, or a special viewing device. For movies and videos, the display method may involve the viewer wearing glasses which permit a different color space or polarization to reach each eye, or which shutter alternating frames between right-eye views and left-eye views.

The perceived depth of an object may be determined by the angle at which the viewer's eyes converge. This is also the case when viewing a 3-D image that is displayed on a surface. Where both eyes view the same object in the same location, the object will appear to be positioned at the same distance of the display surface. This is because the eyes are converged at that distance just as they would be if an actual object were placed at that distance. When there is no separation between the images for the left eye and the right eye, this is referred to as zero parallax.

If the position of an object in the left eye's view is located to the right, and the position of the object in the right eye's view is located to the left, this is called negative parallax, and the eyes have to rotate inward (cross-eyed) to converge the images into a single image. In this case, the object is perceived to be located in front of the display surface.

If the position of an object in the left eye's view is located to the left, and the position of the object in the right eye's view is located to the right, this is called positive parallax, and the eyes have to rotate outward (more wall-eyed) to converge the images into a single image. In this case, the object is perceived to be located beyond the display surface. In short, when viewed in stereo pairs, an object must have negative parallax to appear closer than the display surface, and an object must have positive parallax to appear further away than the display surface. An object with zero parallax will appear to be at the distance of the display surface. Referring now to FIGS. 1A, 1B and 2, there are shown examples of how parallax allows a human to perceive distance.

In FIG. 1A, a distant object 10 is perceived by a human as a single image from the two images viewed by the left and right eyes. The index finger 12 is seen as a double image while viewing the distant object 10. In particular, the left eye sees the index finger 12 offset to the right by a distance 16 and the right eye sees the index finger 12 offset to the left by a distance 14. In this case, there is a relatively small negative parallax.

In FIG. 1B, an index finger 20 is perceived by a human as a single image from the two images viewed by the left and right eyes. A distant object 22 is seen as a double image while viewing the index finger 20. The left eye sees the distant object 22 offset by a distance 24 to the left of the index finger 20 while the right eye sees the distant object 22 offset by a distance 26 to the right of the index finger 20.

Referring now to FIG. 2, there is shown an example of parallax and perceived distance of an image shown on a display surface 30. For purposes of this example, a triangle 32, a circle 34, and a square 36 are shown in the perceived locations, i.e., the locations where they are perceived to be by the human mind. In regard to the triangle 32, both the left eye and the right eye see the single image of the triangle 32 at the same location. In the case of the triangle 32, there is zero parallax as the eyes converge to see the single image at the distance of the display surface 30, so the location of the triangle 32 is perceived to be at the distance of the display surface 30.

In regard to the circle 34, the perceived location of the circle 34 is created by images 34A and 34B on the display surface 30. In particular, the left eye views the image 34A and the right eye views the image 34B such that the location of the circle 34 is perceived in front of the display surface 30. In this case, the eyes rotate inward (cross-eyed) to converge the images 34A and 34B into a single image, which is defined as negative parallax.

In regard to the square 36, the left-eye views the image 36A on the display surface 30 and the right eye views the image 36B on the display surface 30 such that the location of the square 36 is perceived beyond the display surface 30.

In this case, the eyes rotate outward to converge the images 36A and 36B into a single image so that the square 36 appears to be further away than the display surface 30, which is defined as positive parallax.

3-D images of real-world objects may be captured by use of a stereoscopic camera having two lenses, one for capturing the right-eye image and one for capturing the left-eye image. If a scene is to be viewed on a flat display surface in front of the viewer (such as on a television or movie screen), positive parallax can be captured by aiming the two cameras slightly toward each other (with a slight toe-in). The two cameras would both aim at a point along a central viewing axis. Optimally, this point would be the same distance from the cameras as the display surface would be from the audience. This way, the scene would appear correctly when viewed in 3-D stereo, with close objects having a negative parallax, objects at the distance of the display surface having zero parallax, and distant objects having positive parallax. These concepts are depicted in FIG. 3 as will now be explained.

FIG. 3 depicts a top view of a 3-D scene when captured for display on a flat display surface 50. The 3-D scene may be filmed using a left-eye camera 58 and a right-eye camera 60. The left-eye camera 58 and the right-eye camera 60 may be offset from a centerline, or y axis by an amount c, representing the interocular distance needed to create a 3-D image. There is shown a desired perceived position of a triangle 52, a circle 54, and a square 56 from the perspective of the viewer and in relation to the display surface 50.

In order to have the perceived position of the triangle 52 to appear at the same distance as the display surface 50, the triangle 52 is positioned along the y axis at the same distance as the display surface 50 and the aim of a left-eye camera 58 and the aim of a right-eye camera 60 converge at a distance equal to the distance of the display surface 50 from the viewer.

Circle 54 will appear to be located in front of display surface 50 because it is offset to the right in the left-eye view and offset to the left in the right-eye view (defined as negative parallax). Square 56 will appear to be located beyond the display surface 50 because it is offset to the left in the left-eye view and offset to the right in the right-eye view (defined as positive parallax).

Converging the aim of the cameras as described above will create positive parallax only in the direction of the camera convergence. In FIG. 3, for example, the cameras converge along the y axis. This will produce positive parallax in the direction of the y axis and enable display of 3-D objects that appear to be located beyond a flat display surface. This method works for flat display surface 50, because the position of display surface 50 is offset from the cameras in the direction of the y axis. But the aforementioned method is not suitable for images that will be viewed on a dome surface, as explained in the paragraph below.

In a dome environment, images are projected on the inside of a hemispherical, dome display surface. The images are captured with a dome camera which uses a circular fisheye lens to yield 180-degree views, for example an astronomy image of the entire night sky. The majority of the image viewed is high in the dome above, behind, and to the sides of the viewer, rather than just in front of the viewer of a flat surface display. To capture 3-D objects that will appear to be located beyond a dome display surface, right-eye and left-eye dome cameras capturing the scene must be aimed in a direction parallel to the central viewing axis, or undesirable effects will be produced: If the two dome cameras were aimed with a toe-in as described above for a flat display surface, positive parallax would only be produced in an area of the dome in the direction of the y axis directly in front of the viewer. As the viewer looks upward in the dome at angles above the y axis, the positive parallax effect diminishes and then reverses in areas of the scene overhead and behind the viewer. For example, consider FIG. 3 in three dimensions. If circle 54 were raised a great distance above the plane of the drawing (in the z axis direction, which would be above the viewer), positive parallax could never be achieved by the depicted camera convergence. Even at a great distance, circle 54 will always appear to be located in front of the dome display surface because it will be offset to the right in the left-eye view and offset to the left in the right-eye view (negative parallax). Positive parallax can only be created in the direction of camera convergence, in this case the y axis, and regardless of actual distance, the effect will actually be reversed on any object whose y component of distance is located in front of the point of camera convergence. In addition, if the dome cameras are angled to create the convergence on the y axis in front of the viewer, objects overhead would be captured at different angles in the right-eye camera and the left-eye camera, so these overhead objects in the resulting image would appear to crisscross. The minds of the viewers would not be able to make sense of these anomalies, and the illusion of 3-D would be destroyed.

Therefore, cameras capturing 3-D stereo to be rendered on a dome surface must be parallel to each other (parallel to the central viewing axis). As a result, positive parallax cannot be captured from the original scene. So objects in the stereo images can only appear to be at located the dome surface or closer to the viewer, and none will appear to be located beyond the dome surface.

The prior art is thus characterized by several disadvantages that are addressed by the present disclosure. The present disclosure minimizes, and in some aspects eliminates, the above-mentioned failures, and other problems, by utilizing the methods and structural features described herein. The method described by the present disclosure allows positive parallax to be captured in front of the viewer, upward in an arc through the zenith of the dome, and beyond to the back of the dome. The method allows scenes to contain positive parallax on a dome surface (and therefore allows objects to appear to be located beyond the dome surface when viewed in 3-D stereo), which was previously not possible.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

DETAILED DESCRIPTION

Figure 1A:
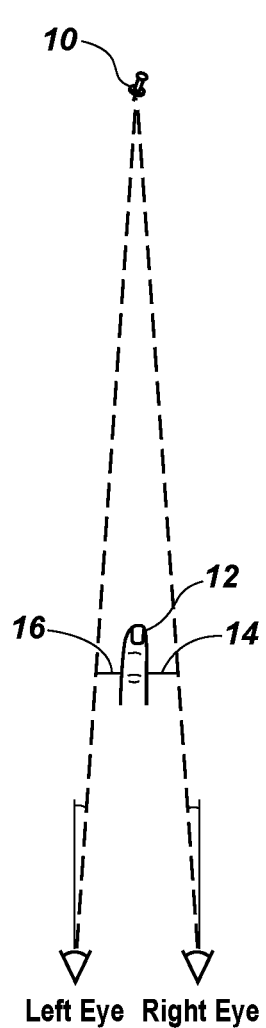
FIGS. 1A & 1B are illustrations of convergence and parallax.
Figure 1B:
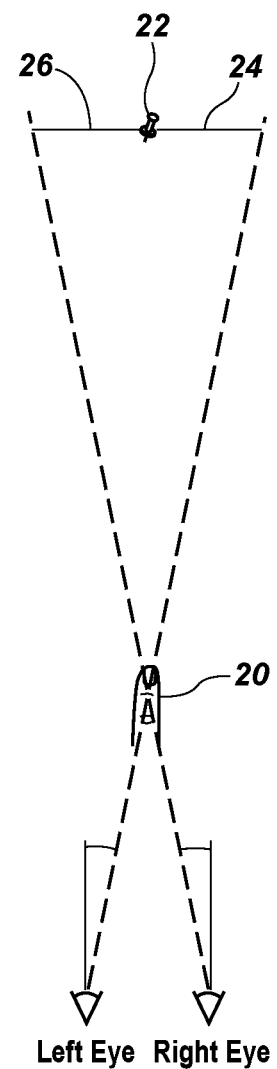
Figure 2:
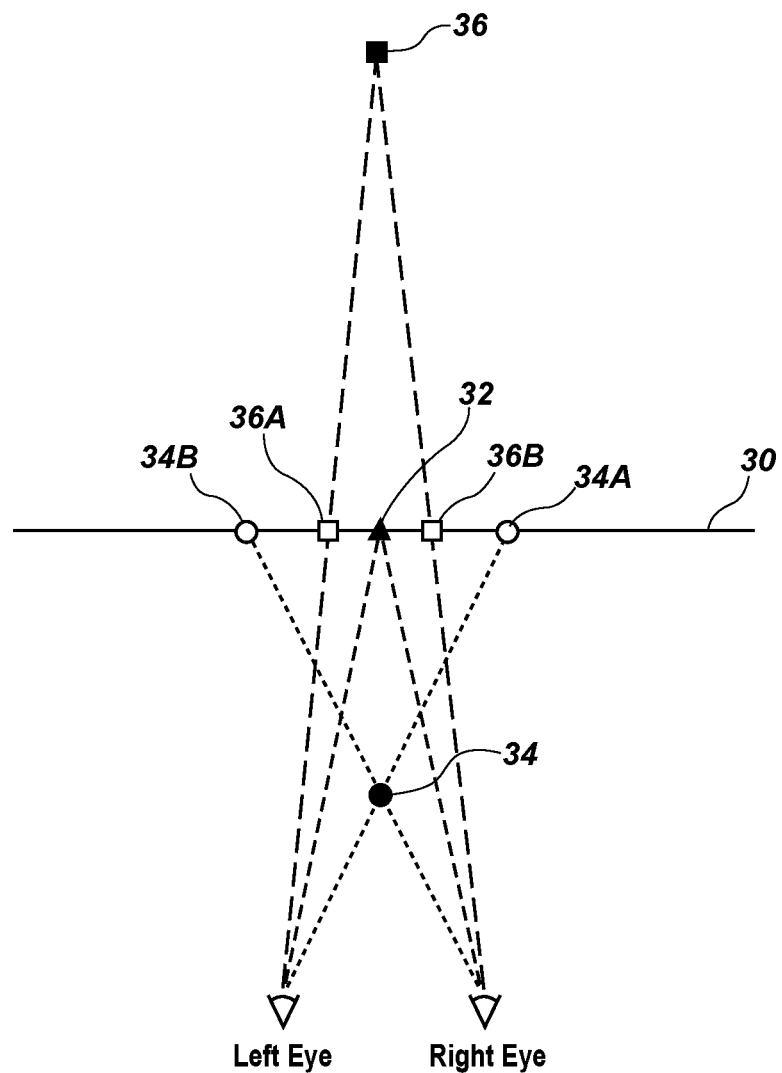
FIG. 2 depicts the concepts of parallax and perceived distance.
Figure 3:
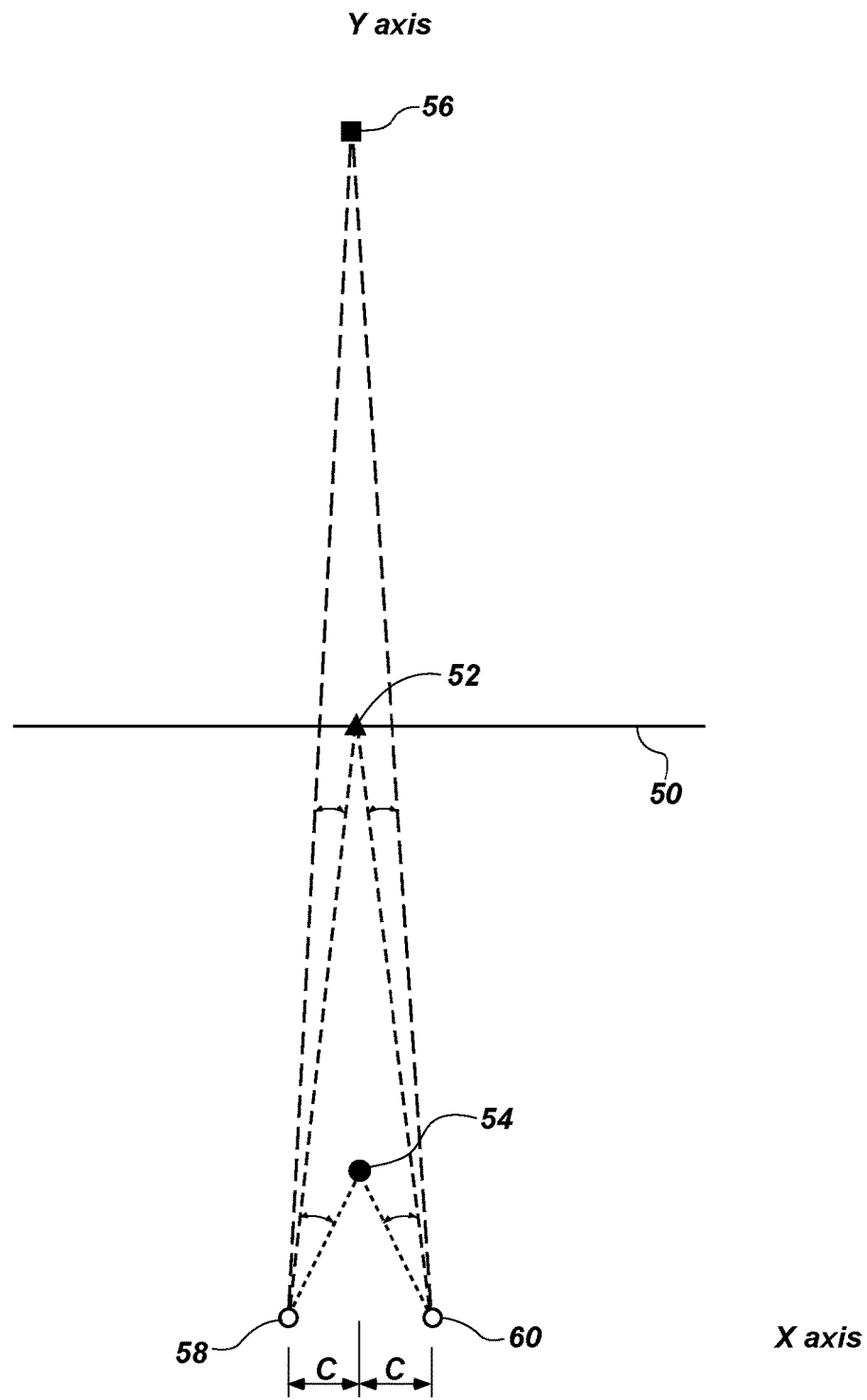
FIG. 3 is a top view of a 3-D stereo scene when captured for display on a flat display surface.

For the purposes of promoting an understanding of the important principles in accordance with this disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. As used herein, the terms "comprising," "including," "containing," "characterized by," and grammatical equivalents thereof are inclusive or open-ended terms that do not exclude additional, unrecited elements or method steps.

As used herein, the term "object" refers to a scene element, which may refer to, but is not be limited to, a dot, a line, a sprite, a complete computer-graphic model, a part of a computer-graphic model, a virtual surface, a vertex on a virtual polygonal surface, or a texture mapping coordinate on a computer-graphic model. Any of these scene elements can be offset in the manner described herein to achieve positive parallax.

Figure 7:
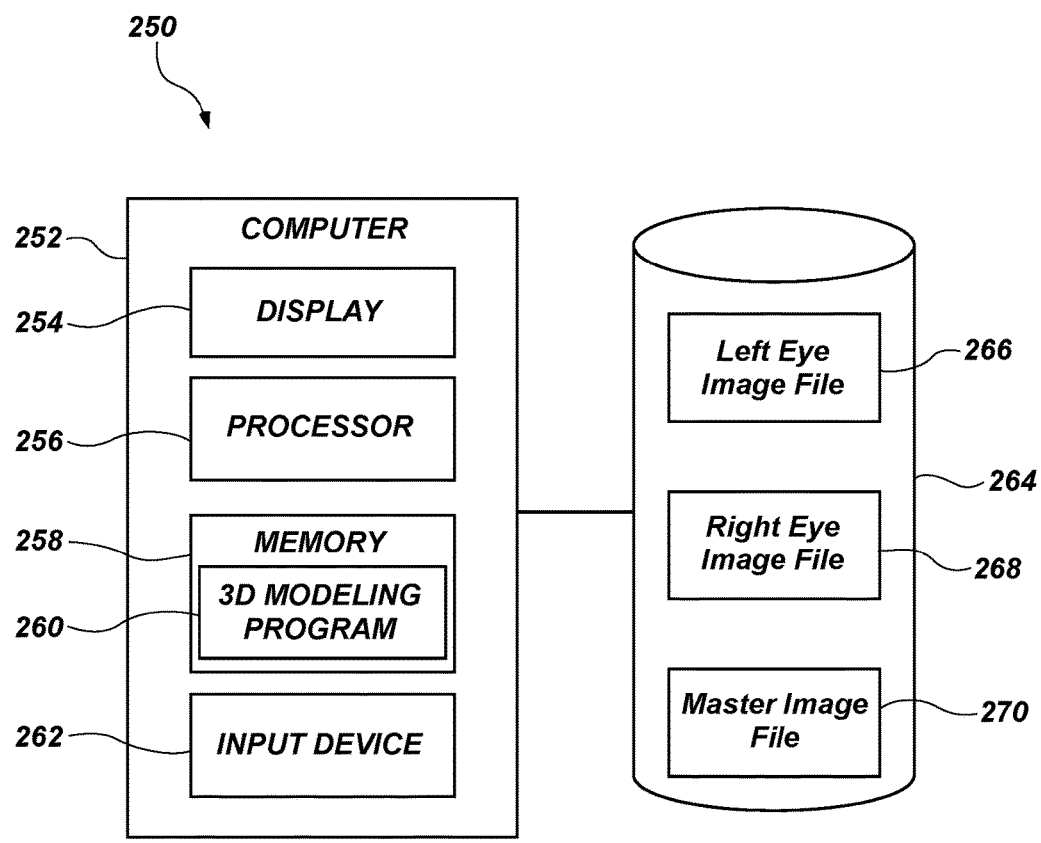
FIG. 7 depicts a system for creating a 3-D image pursuant to an embodiment of the present disclosure.

Applicant has discovered a method and system for generating a stereoscopic pair of images for use in creating 3-D images on a surface, such as a dome surface. Referring now to FIG. 7, there is depicted a system 250 for generating a computer generated 3-D image for display on a surface using a projector. In an embodiment of the present disclosure, the surface may be a dome surface. The system 250 may comprise a computer 252. The computer 252 may comprise a display 254 as is known to one having ordinary skill in the art. The computer 252 may further comprise a processor 256 for executing programming instructions. The processor 256 may be coupled to a memory 258. The memory 258 may store programs for execution by the processor 256. The computer 252 may further comprise an input device 262 for allowing a user to provide input for creating the necessary 3-D image. The input device 262 may comprise a computer mouse and a key board. The computer 252 may also be connected to a data storage device 264, such as a non-volatile memory device, e.g., a hard drive, for storing image data.

In an embodiment of the present disclosure, the memory 258 may have stored therein a 3-D modeling program 260. The 3-D modeling program 260 may provide suitable software tools for 3-D modeling, visual effects, and 3-D rendering. A commercially available 3-D modeling program 110 may be suitable. Such commercially available 3-D modeling program may include the AUTODESK® MAYA® 3D computer animation software or the AUTODESK® 3DS MAX® computer animation software. Using the 3-D modeling program 260, a user may create a computer-generated model using the system 250. The computer-generated model created by the user may comprise one or more virtual objects or scene elements that the user desires to be perceived by viewers in 3-D on a dome surface.

As explained above, in order to generate a 3-D image, a stereoscopic pair of images is created from a virtual scene. The user may create the virtual scene using the 3-D modeling program 250 running on the processor 256 as is known to one having ordinary skill in the art. In order to create a stereoscopic pair of images, the 3-D modeling program 260 may allow the user to position one or a pair of virtual cameras within the computer-generated and virtual scene. In an embodiment, one of the virtual cameras may be designated as the left-eye camera while the other may be designated as the right-eye camera. Alternatively, a single virtual camera may be moved between the left-eye and right-eye camera positions.

The heading or central optical axis of the left-eye virtual camera and the right-eye virtual camera are parallel or substantially parallel. Stated another way, the heading or central optical axis of the left-eye virtual camera and the right-eye virtual camera are in parallel parallax. In an embodiment of the present disclosure, when creating stereo pairs for a video scene or still image, the frames from the left-eye virtual camera are typically rendered separately from the frames from the right-eye virtual camera.

In an embodiment of the present disclosure, before the processor 256 renders the frames from the left-eye virtual camera, any distant objects that the animator wishes to be seen with positive parallax are positioned or offset to the left of their desired position in the virtual scene. Before the processor 256 renders frames from the right-eye virtual camera, those objects are positioned or offset to the right of their desired position by the same distance in the virtual scene. It will be appreciated that these objects can be simple objects within the scene, or hemispherical, flat or curved surfaces textured with background images.

The processor 256 may store images captured by the left-eye virtual camera as a left-eye image file 266 on the data storage device 264 and the processor 256 may store images captured by the right-eye virtual camera as a right-eye image file 268 on the data storage device 114. The left-eye image file 266 and the right-eye image file 268 may contain the appropriate data or formatting to render the images to a viewer's left eye or right eye depending on the desired 3-D methodology, e.g., polarization filtering (passive or active), shutter filtering (mechanical shutters), color filtering (anaglyph), autostereoscope, etc.

In an embodiment of the present disclosure, objects may be offset from their original positions manually by the user. Alternatively, the user may simply select the object to be offset, and the processor 256 may automatically offset the object from its original position prior to rendering based upon the desired location of where the object will appear in 3-D.

In an embodiment of the present disclosure, the images captured by the right-eye and left-eye virtual cameras, and as stored as the left-eye image file 266 and the right-eye image file 268 in the data storage device 264, respectively, can then be combined by the processor 256 into a master image file 270, which is then stored in the data storage device 264. The master image file 270 may be formatted depending on the 3-D display technology being used. In an embodiment of the present disclosure, the left-eye image file 266 and the right-eye image file 268 are maintained as separate image files.

When played, the master file 270, or the left-eye image file 266 and the right-eye image file 268, may generate images of a movie, art piece, video game, film, simulator, television program, still image, or animation suitable for display on a dome surface. Again, the processor 256 executing the instructions of the 3-D modeling program 260 may facilitate the user creating the master image file 270 and the left-eye image file 266 and the right-eye image file 268.

Figure 4:
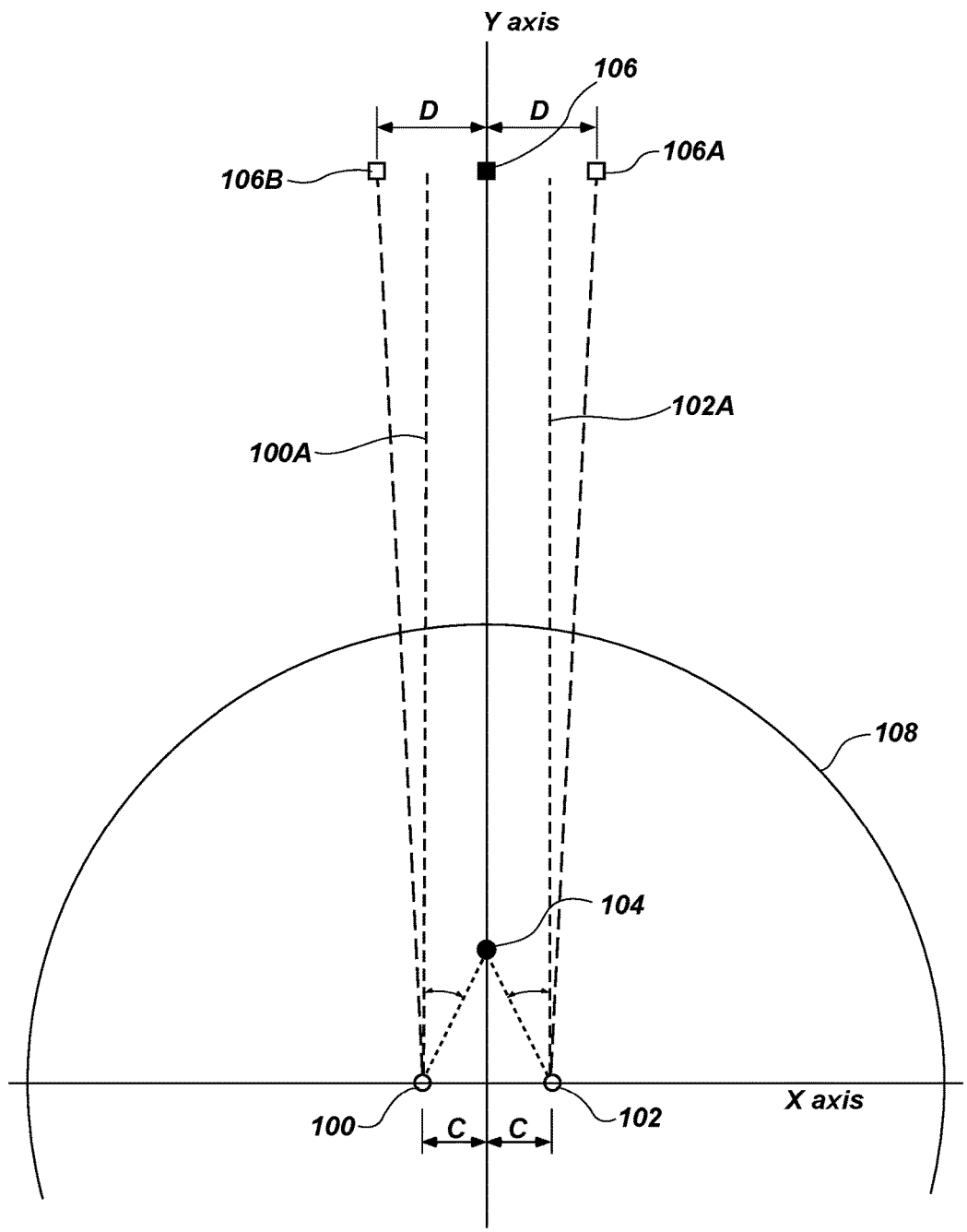
FIG. 4 is a top view of a 3-D stereo scene when captured for display on a dome surface.

Referring now to FIG. 4, there is depicted a top view of a 3-D stereo scene when captured for display on a dome surface. In embodiments of the present disclosure, the 3-D stereo scene may be a virtual scene, captured with virtual cameras, or a real-world scene, captured with real-world cameras. The virtual scene may be generated and filmed using a computer, such as the computer 252. For purposes of convenience, a coordinate system with the x axis pointing to the right, the y axis pointing straight ahead, and the z axis pointing up is designated.

The 3-D scene may be filmed using a left-eye camera 100 and a right-eye camera 102. The left-eye camera 100 and the right-eye camera 102 may be offset from a centerline, or y axis, by an amount c, where 2c represents an interocular distance needed to create a 3-D image. There is shown a desired perceived position of objects in the scene, namely, a circle 104 and a square 106, from the perspective of a viewer and in relation to a dome display surface 108 (the dome display surface 108 is not actually present during the filming of the scene, but its location and distance from the viewer is needed in order to generate 3-D images in the proper perceived position). The heading or aim 100A of the left-eye camera 100 and the heading or aim 102A the right-eye camera 102 are parallel or substantially parallel with each other and the y axis in the scene.

The square 106, which represents an exemplary object in the scene, is located on the y axis in its desired viewing position or original position, which is also the position where the object will be perceived by viewers, but in 3-D. Thus, in FIG. 4, the square 106 is desired to appear behind the surface of the domed viewing surface 108. For images captured by the left-eye camera 100, the square 106 is offset to the left of the y axis by a distance o to the offset position 106B. For images captured by the right-eye camera 102, the square 106 is offset to the right of the y axis by a distance o to the offset position 106A.

It will be appreciated that the images captured by the left-eye camera 100 and the right-eye camera 102 may be rendered separately from each other. The separately captured renderings may then be prepared for presentation in 3-D. In an embodiment of the present disclosure, the images captured by the left-eye camera 100 and the right-eye camera 102 may be stored as two image files on an electronic data storage medium. The image files may be processed for 3-D display.

Figure 5:
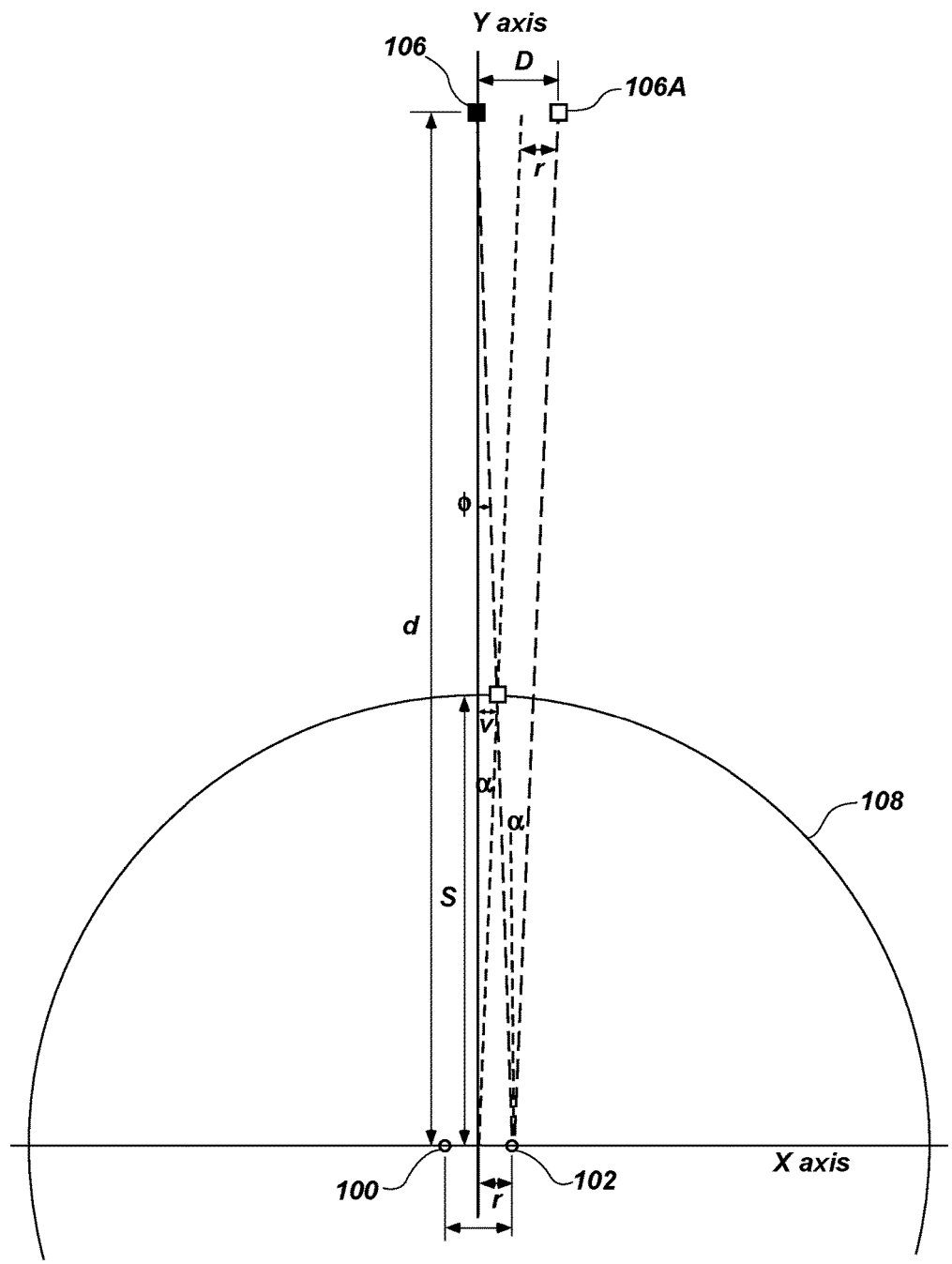
FIG. 5 depicts a calculation of offset to create positive parallax to simulate real-world distances.

Referring now to FIG. 5, there is shown a diagram with the variables of calculation to determine the necessary offset, o, to create positive parallax to simulate real-world distances pursuant to an embodiment of the present disclosure, where like reference numerals depict like components. An assumption may be made that the viewer is seated in the center of the dome. TABLE 1, below, lists the variables needed to calculate the offset, o.

TABLE 1

| Variable | Status | Description |
| --- | --- | --- |
| d | Known | Distance along the y axis from observer to distant object |
| s | Known | Distance from observer to dome display surface |
| i | Known | Interocular distance of cameras and observer |
| r | Known | Offset of observer's right eye and of right-eye camera (=i/2) |
| ∅ | Unknown | Angle from distant object to right eye of observer |
| v | Unknown | Offset distance in x direction where right eye of observer would see distant object at distance of the dome surface |
| α | Unknown | Angle of positive parallax |
| o | Unknown | Distant of object's offset in x direction for right-eye virtual camera |

The unknown variables in TABLE 1, may be determined using the following equations:

$$\emptyset = \tan^{-1}(r/d)$$

$$v = (d-s)\tan \emptyset$$

$$\alpha = \tan^{-1}(v/s)$$

$$o = (d \tan \alpha) + r$$

The above can also be applied to the left-eye camera 100 and the object's left offset from the y axis in the x direction.

Figure 6:
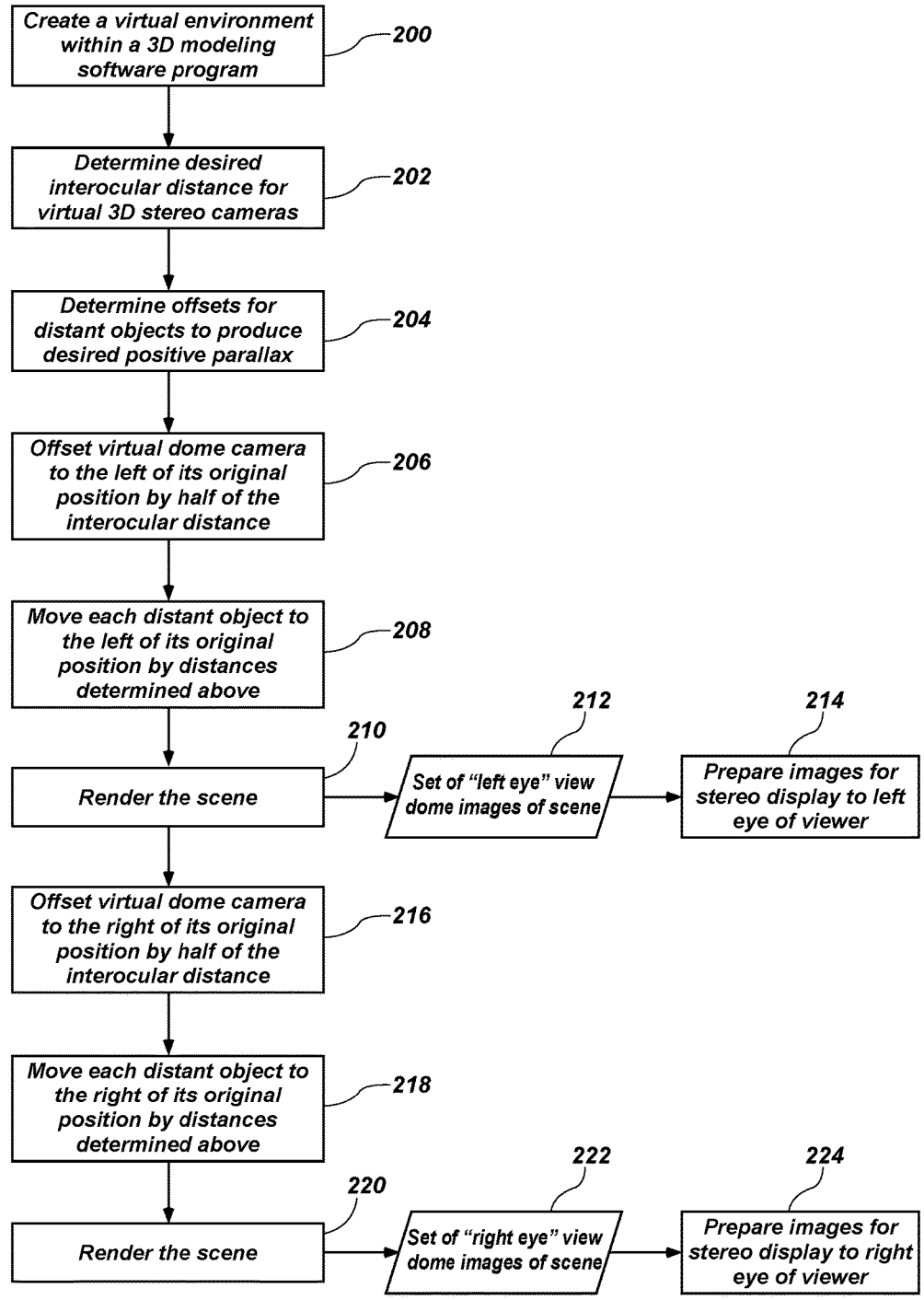
FIG. 6 is a flow chart showing a process of creating positive parallax on distant objects.

Referring now to FIG. 6, there is depicted a flow diagram of a process for creating positive parallax on distant objects within a virtual environment for display on a dome surface. The process in FIG. 6 may utilize a computer system, such as a computer system 250 as shown in FIG. 7. At step 200, a user may create a virtual environment using a 3-D modeling program running on a computer. At step 202, the desired interocular distance between a left-eye virtual camera and a right-eye virtual camera is determined. The interocular distance, or distance along the x axis between left-eye and right-eye virtual cameras (or actual cameras for filming real-world scenes) is somewhat arbitrary. The distance may be dependent on the distance from the cameras to the closest object in the scene, and the strength of stereo effect desired. To closely simulate a human view in an every-day environment, the left and right cameras should be spaced at the same distance that human eyes are spaced, roughly 65 mm apart. If rendering a small-scale scene, the distance would be much smaller, and if rendering a large-scale scene, the distance would be much greater. Also, the greater the spacing, the greater the 3-D effect. The heading or aim of the left-eye camera 100 and the heading or aim of the right-eye camera 102 are parallel or substantially parallel with each other and the y axis in the scene.

At step 204, the offsets for distant objects to produce the desired positive parallax are determined. The amount of positive parallax one would want to introduce to distant objects is somewhat arbitrary as well. The more positive parallax the eye sees, the further away the object will appear. So the most distant object in a scene should be given the greatest positive parallax. Objects just beyond the distance of the viewing surface (the dome surface) should be given the smallest positive parallax. The amount of positive parallax given to objects in between these objects should fall in between these amounts, proportional to their distance. And the actual distance of the offset in the x direction to produce a certain amount of positive parallax is dependent on the distance that object lies away from the eye point (in the y direction), so the easiest way to consider positive parallax is by angle. Positive parallax must be below about 5 degrees for the human mind to process it. And it is most comfortable for the viewer at 3 degrees or less.

If the simulation of real-world distances is desired, then simple trigonometry can yield the amount of offset that should be given to distant objects. FIG. 5 illustrates such a calculation. It is likely, however, that the artist may want to exaggerate the positive parallax of distant objects to enhance the 3-D effect of a scene. In this case, the calculated offset values would be multiplied by a factor which would increase distant offsets, while keeping the largest positive parallax (of the most distant object in the scene) below 3 degrees.

At step 206, the virtual camera is offset to the left of its original position by half of the interocular distance. At this point, the virtual camera is functioning as the left-eye virtual camera. At step 208, each distant object is moved to the left of its original position by the offset distance as determined at step 204. At step 210, the virtual scene is rendered with the virtual camera in the left-eye position. At step 212 and 214, the left-eye images are prepared for stereo display to the left eyes of viewers.

At step 216, the virtual dome camera is offset to the right of its original position by half of the interocular distance. At this point, the virtual camera is functioning as the right-eye virtual camera. At step 218, each distant object is moved to the right of its original position by the offset distance as determined at step 204. At step 220, the virtual scene is rendered with the virtual camera in the right-eye position. At steps 222 and 224, the right-eye images are prepared for stereo display to the right eyes of viewers. Once the left-eye and the right-eye images are prepared and formatted according the 3-D display technology, they may be projected by a projector onto a dome surface for viewing by an audience.

Figure 8:
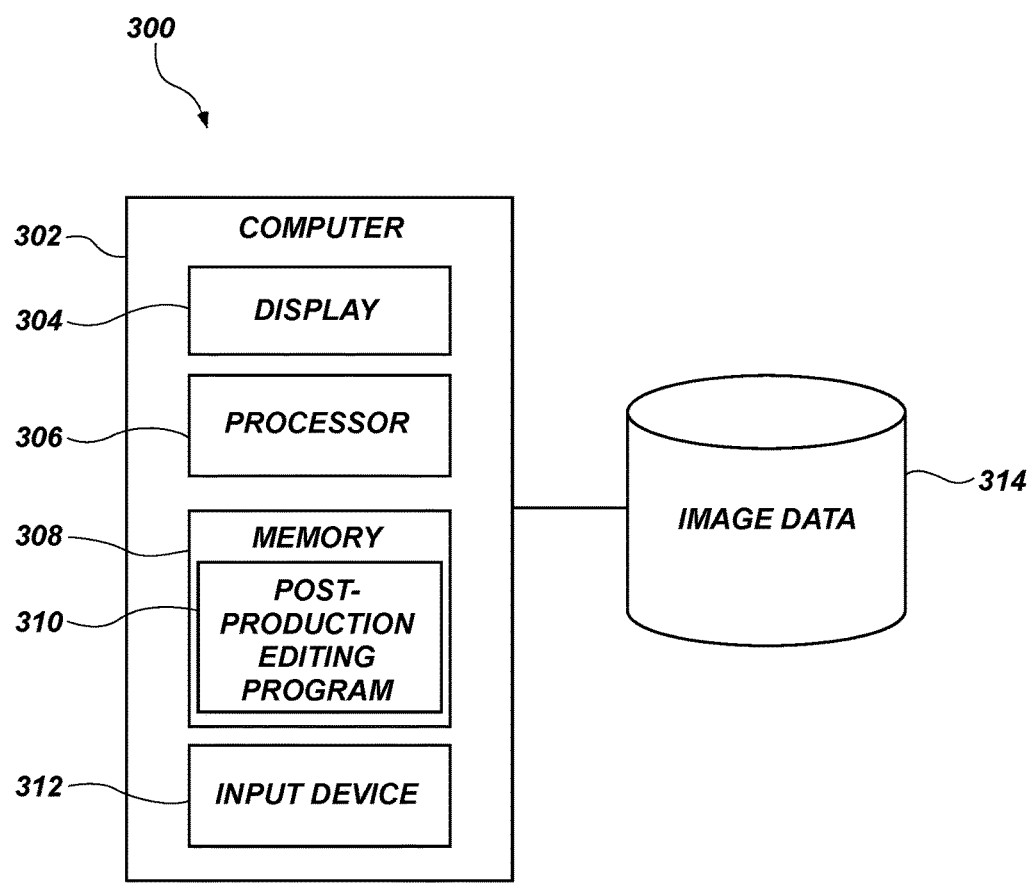
FIG. 8 depicts a system for creating a 3-D image pursuant to an embodiment of the present disclosure.

Referring now to FIG. 8, there is depicted a system 300 for generating a computer generated 3-D image for display on a surface using a projector. In an embodiment of the present disclosure, the surface may be a dome surface. The system 300 may comprise a computer 302. The computer 302 may comprise a display 304 as is known to one having ordinary skill in the art. The computer 302 may further comprise a processor 306 for executing programming instructions. The processor 306 may be coupled to a memory 308. The memory 308 may store programs, or instructions, for execution by the processor 306. The computer 302 may further comprise an input device 312 for allowing a user to provide input for creating the necessary 3-D image. The input device 312 may comprise a computer mouse and a key board. The computer 302 may also be connected to a data storage device 314, such as a non-volatile storage device, for storing image data.

In an embodiment of the present disclosure, the memory 308 may have stored therein a post-production editing program 310. Commercially available post-production editing programs may be suitable such as ADOBE® AFTER EFFECTS®. The program 310, when executed by the processor 306, may allow scene elements to be offset in post-production. For example, scene elements that have been rendered separately in a modeling program as described above, can be composited together into a scene in a compositing program, sliding distant objects in the left-eye view to the left, and sliding distant objects in the right-eye view to the right by the same distance, to generate the desired positive parallax.

In an embodiment of the present disclosure, the invention described herein could also be used when capturing stereo pair frames of real-world scenes by video or still camera. Frames for the right-eye camera could be captured at a separate time than frames for the left-eye camera. Distant objects could be moved, as described above, before capturing each camera view. Alternatively, scene elements could be filmed separately, then given their left and right offset when combined in a compositing program (as described above) to achieve positive parallax.

It will be appreciated that the processes and systems described herein may create stereo-pair "dome masters" (or hemispherical images) to be displayed and viewed on a dome surface. These stereo pairs may be for a single still image, or a series of frames that, when displayed in sequence, constitute a video segment. When displaying real-time computer-generated graphics, the horizontal offset of distant objects to create positive parallax could be applied in software by a processor of a computer at the time that the scene elements are displayed in the separate left-eye and right-eye views.

Whether being displayed in real-time, or as a rendered still or video segment, the left-eye view of the stereo pair is displayed to the left eye of the viewer, and the right-eye view of the stereo pair is displayed to the right eye of the viewer in order for the 3-D stereo effect to occur. As mentioned above, the processes by which these images are then processed or independently displayed to the eyes will not be described in detail herein as they are readily known to one having ordinary skill in the art.

Figure 9:
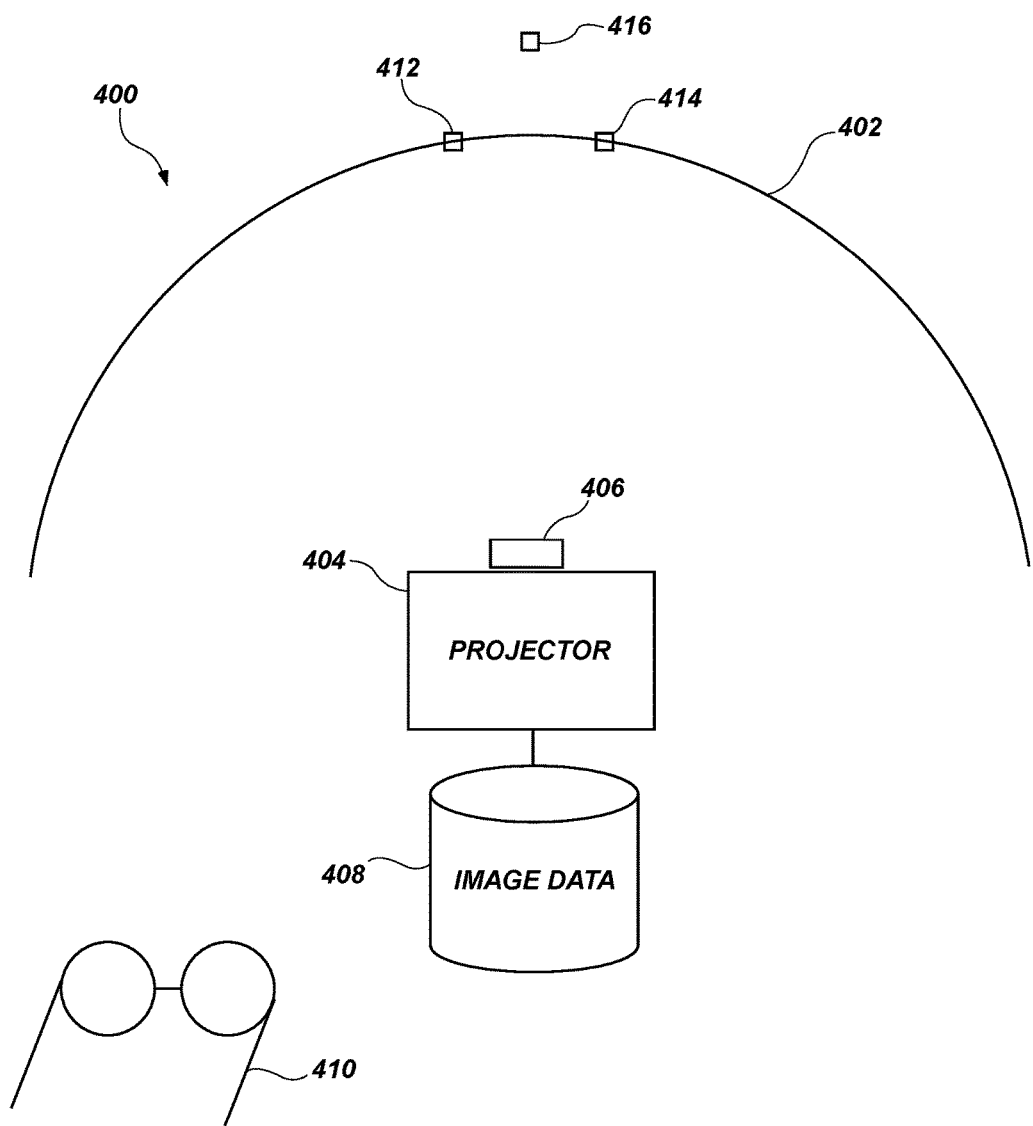
FIG. 9 depicts a projection system for displaying 3-D images pursuant to an embodiment of the present disclosure.

Referring now to FIG. 9, there is depicted a system 400 for displaying an image. The system 400 may comprise a dome surface 402. A projector 404 having a projection lens 406 may be positioned to project images onto the dome surface 402. A data storage device 408 may be connected to the projector 404. The data storage device 408 may provide image data to the projector 404. The projector 404 may project 3-D images onto the dome surface 402. The 3-D images displayed on the dome surface 402 may be generated by the methods described above, including the method described in connection with FIG. 6. A viewer may use a pair of 3-D glasses 410 to view the 3-D images on the dome surface 402. The system 400 projects scenes containing positive parallax onto the dome surface 402 and therefore allows objects to appear to be located beyond the dome surface 402 when viewed in 3-D stereo, which was previously not possible. For example, based upon the image data, the projector 404 may project a left-eye image 412 and a right-eye image 414 onto the dome surface 402. A viewer, wearing the 3-D glasses 410, may perceive an object formed from the left-eye image 412 and a right-eye image 414 as being positioned behind the dome surface 402 as shown by object 416. In this case, the eyes of the viewer wearing the 3-D glasses 410 are in positive parallax. It will be appreciated that the system 400 may be adapted to display 3-D images using any desired technology, including, polarization filtering (passive or active), shutter filtering (mechanical shutters), color filtering (anaglyph), autostereoscope, etc.

It will be appreciated that the structure and apparatus disclosed herein is merely one example of a means for generating and displaying a distant 3-D stereo image on a dome surface, and it should be appreciated that any structure, apparatus or system for generating and displaying a distant 3-D stereo image on a dome surface which performs functions the same as, or equivalent to, those disclosed herein are intended to fall within the scope of a means for generating and displaying a distant 3-D stereo image on a dome surface, including those structures, apparatus or systems for generating and displaying a distant 3-D stereo image on a dome surface which are presently known, or which may become available in the future. Anything which functions the same as, or equivalently to, a means for generating and displaying a distant 3-D stereo image on a dome surface falls within the scope of this element.

The cameras disclosed herein may be real-world cameras especially adapted for filming in 3-D or virtual cameras for capturing scenes in virtual worlds as is known to one having ordinary skill in the art.

Those having ordinary skill in the relevant art will appreciate the advantages provided by the features of the present disclosure. For example, it is a feature of the present disclosure to provide a system for generating a 3-D image for display on a dome surface. Another feature of the present disclosure is to provide such a projection system for displaying distant 3-D stereo on a dome surface. It is a further feature of the present disclosure, in accordance with one aspect thereof, to provide a process of capturing positive parallax for a dome scene by leaving the cameras parallel, and simply moving distant objects to the right in the right-camera view, and to the left in the left-camera view.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed:

1. A method of generating a stereoscopic pair of images for use in forming a 3-D image of an object at a desired perceived position in a scene, said method comprising:
    moving the object to a left offset position in the scene, the left offset position being located to a left side of the desired perceived position in the scene;
    capturing a left image of the object in the left offset position using a camera in a left camera position;
    moving the object to a right offset position in the scene, the right offset position being located to a right side of the desired perceived position in the scene;
    capturing a right image of the object in the right offset position using a camera in a right camera position; and
    preparing the left image and the right image for stereoscopic display of the scene.

2. The method of claim 1, further comprising:
    determining a distance between the desired perceived position in the scene and each of the left offset position and the right offset position.

3. The method of claim 1, further comprising:
    determining a distance between the left camera position and the right camera position.

4. The method of claim 1, wherein the object is a scene element.

5. The method of claim 1, further comprising:
    orienting the camera in the left camera position to a left camera heading and orienting the camera in the right camera position to a right camera heading, wherein the left camera heading and the right camera heading are parallel to one another.

6. The method of claim 1, wherein preparing the left image and the right image for stereoscopic display comprises generating a master image file from the left image and the right image.

7. The method of claim 1, wherein the object is a real-world object.

8. The method of claim 1, wherein the object is a virtual object, the scene is a virtual scene, each camera is a virtual camera capable of generating an image, moving the object to the left offset position and moving the object to the right offset position comprise virtually moving the object, and capturing the left image and capturing the right image comprise digitally preparing the left image and digitally preparing the right image.

9. The method of claim 1, wherein preparing the left image and the right image comprises preparing the left image and the right image for stereoscopic display of the scene on a concave surface that at least partially surrounds an audience and on which the object appears to be in positive parallax due to the left offset position of the object in the left image and the right offset position of the object in the right image.

10. The method of claim 9, further comprising:
    displaying the left image and the right image on the concave surface such that the object is perceived by a viewer in the audience as a 3-D image of the object positioned at the desired perceived position.

11. The method of claim 10, wherein the concave surface is a dome surface.

12. The method of claim 11, wherein the desired perceived position is beyond the dome surface.

13. A method of generating a stereoscopic pair of images for use in forming a 3-D image, said method comprising:
    creating a virtual environment using a computer;
    determining a desired interocular distance between a left camera position and a right camera position in the virtual environment;
    determining an offset distance for an object in the virtual environment from a desired perceived position to produce a desired positive parallax; and
    generating a left image in which the object appears in the virtual environment at a left offset position at the offset distance from a left side of the desired perceived position;
    generating a right image in which the object appears in the virtual environment at a right offset position at the offset distance from a right side of the desired perceived position; and
    preparing the left image and the right image for stereoscopic display.

14. The method of claim 13, wherein the object is a scene element.

15. The method of claim 13, further comprising:
    displaying the left image and the right image on a surface such that the object is perceived by a viewer as a 3-D image of the object positioned at the desired perceived position.

16. The method of claim 15, wherein:
preparing the left image and the right image for stereoscopic display comprises preparing the left image and the right image for stereoscopic display on a concave surface to the viewer at least partially surrounded by the concave surface; and
displaying the left image and the right image comprises displaying the left image and the right image on an inside of the concave surface.

17. The method of claim 16, wherein the desired perceived position is beyond the inside of the concave surface.

18. A system for generating a 3-D image, comprising:
a processor;
a memory accessible by the processor, the memory comprising instructions that, when executed by the processor, cause the processor to identify a desired perceived position in a scene, generate a left image of a scene with an object in a left offset position at an offset distance to a left side of the desired perceived position, generate a right image of the scene with the object at the offset distance to a right side of the desired perceived position, store the left image of the scene in a left image file and store the right image of the scene in a right image file.

19. The system of claim 18, wherein the memory further comprises instructions that, when executed by the processor, cause the processor to allow a user to define the scene.

20. The system of claim 18, wherein instructions cause the processor to generate the left image and the right image as a stereoscopic pair of images.

21. The system of claim 20, wherein the memory further comprises the instructions that, when executed by the processor, cause the processor to prepare the left image and the right image for stereoscopic display.

22. The system of claim 21, wherein the instructions, when executed by the processor, cause the processor to prepare the left image and the right image for stereoscopic display such that the object appears beyond a surface onto which the left image and the right image are to be projected.

23. The system of claim 21, wherein the instructions, when executed by the processor, cause the processor to prepare the left image and the right image for stereoscopic display on a concave surface.

24. The system of claim 23, wherein the instructions, when executed by the processor, cause the processor to prepare the left image and the right image for display on an inside of at least a portion of a dome surface.

25. A method of generating a 3-D image on a dome surface from a stereoscopic pair of images, the dome surface capable of at least partially surrounding an audience, the method comprising:
projecting the stereoscopic pair of images onto an inside of the dome surface with a projection system such that a viewer perceives a location of an object in the 3-D image formed from the stereoscopic pair of images as being beyond the dome surface.

26. A system for displaying a 3-D image, comprising:
a concave screen;
a processor;
a memory accessible by the processor, the memory storing:
a plurality of left images of a scene with an object at a left offset position from a desired perceived position in the scene; and
a plurality of right images of the scene with the object at a right offset position from the desired perceived position in the scene;
instructions that, when executed by the processor, cause the processor to output a signal of a stereoscopic image including a corresponding pair of images including a left image of the plurality of left images and a right image of the plurality of right images;
a projector capable of receiving the signal from the processor, the projector including a left image projection element capable of projecting the left image of the scene onto the concave screen and a right image projection element capable of projecting the right image of the scene onto the concave screen, the left image projection element and the right image projection element oriented to project the left image of the scene and the right image of the scene in such a way that the object appears to be located beyond a surface of the concave screen.

27. The system of claim 26, wherein the concave screen comprises a dome-shaped screen.

* * * * *